United States Patent
Côté et al.

(10) Patent No.: US 11,356,320 B2
(45) Date of Patent: Jun. 7, 2022

(54) IDENTIFYING AND LOCATING A ROOT CAUSE OF ISSUES IN A NETWORK HAVING A KNOWN TOPOLOGY

(71) Applicant: Ciena Corporation, Hanover, MD (US)

(72) Inventors: David Côté, Gatineau (CA); Petar Djukic, Ottawa (CA); Thomas Triplet, Manotick (CA); Todd Morris, Stittsville (CA); Paul Gosse, Ottawa (CA); Dana Dennis, Kingston (CA); Emil Janulewicz, Ottawa (CA); Patrick Premont, Ottawa (CA)

(73) Assignee: Ciena Corporation, Hanover, MD (US)

( * ) Notice: Subject to any disclaimer, the term of this patent is extended or adjusted under 35 U.S.C. 154(b) by 148 days.

(21) Appl. No.: 16/936,636

(22) Filed: Jul. 23, 2020

(65) Prior Publication Data
US 2021/0028973 A1 Jan. 28, 2021

Related U.S. Application Data

(60) Provisional application No. 62/879,055, filed on Jul. 26, 2019.

(51) Int. Cl.
*H04J 3/14* (2006.01)
*H04L 41/0631* (2022.01)
(Continued)

(52) U.S. Cl.
CPC .......... *H04L 41/065* (2013.01); *G06K 9/6256* (2013.01); *G06N 5/045* (2013.01);
(Continued)

(58) Field of Classification Search
CPC ......... H04B 10/07953; G06K 9/00496; G06K 9/6256; G06K 9/627; G06N 3/0454;
(Continued)

(56) References Cited

U.S. PATENT DOCUMENTS 8,887,217 B2    11/2014   Salem et al.
9,385,917 B1 *   7/2016   Khanna ................... H04L 41/12
(Continued)

OTHER PUBLICATIONS

Boutaba et al., A comprehensive survey on machine learning for networking: evolution, applications and research opportunities, Journal of Internet Services and Applications, 99 pages, 2018.*
(Continued)

*Primary Examiner* — Frank Duong
(74) *Attorney, Agent, or Firm* — Clements Bernard Baratta; Lawrence A. Baratta, Jr.; Christopher L. Bernard

(57) ABSTRACT

Systems and methods for detecting patterns in data from a time-series are provided. According to some implementations, the systems and methods may use network topology information combined with object recognition techniques to detect patterns. One embodiment of a method includes the steps of obtaining information defining a topology of a multi-layer network having a plurality of Network Elements (NEs) and a plurality of links interconnecting the NEs and receiving Performance Monitoring (PM) metrics and one or more alarms from the multi-layer network. Based on the information defining the topology, the PM metrics, and the one or more alarms, the method also includes the step of utilizing a Machine Learning (ML) process to identify a problematic component from the plurality of NEs and links and to identify a root cause associated with the problematic component.

20 Claims, 21 Drawing Sheets

(51) Int. Cl.
*H04L 41/12* (2022.01)
*G06N 20/00* (2019.01)
*H04L 41/16* (2022.01)
*G06N 5/04* (2006.01)
*H04J 3/16* (2006.01)
*H04B 10/079* (2013.01)
*G06K 9/62* (2022.01)

(52) U.S. Cl.
CPC ....... *G06N 20/00* (2019.01); *H04B 10/07953* (2013.01); *H04J 3/1652* (2013.01); *H04L 41/12* (2013.01); *H04L 41/16* (2013.01)

(58) Field of Classification Search
CPC ...... G06N 3/0472; G06N 3/084; G06N 5/045; G06N 20/00; H04L 41/0631; H04L 41/065; H04L 41/12; H04L 41/145; H04L 41/16; H04L 43/0823; H04J 3/14; H04J 3/1652; H04J 2203/0057; G06V 10/25; G06V 10/82
See application file for complete search history.

(56) References Cited

U.S. PATENT DOCUMENTS

| | | | |
|---|---|---|---|
| 9,819,565 | B2 | 11/2017 | Djukic et al. |
| 9,838,271 | B2 | 12/2017 | Djukic et al. |
| 10,015,057 | B2 | 7/2018 | Djukic et al. |
| 10,270,564 | B2 | 4/2019 | Djukic et al. |
| 2016/0112327 | A1 | 4/2016 | Morris et al. |
| 2017/0230267 | A1 | 8/2017 | Armolavicius et al. |
| 2017/0302505 | A1* | 10/2017 | Zafer ..................... H04L 43/08 |
| 2018/0248905 | A1* | 8/2018 | Côté ..................... G06F 17/18 |
| 2018/0359029 | A1* | 12/2018 | Shiner ................. H04J 14/0221 |
| 2019/0230046 | A1 | 7/2019 | Djukic et al. |
| 2019/0303726 | A1* | 10/2019 | Côté ........................ G06N 3/04 |
| 2019/0379589 | A1* | 12/2019 | Ryan ..................... G06N 3/0454 |
| 2020/0092026 | A1* | 3/2020 | Birk ..................... H04L 5/0008 |
| 2020/0092159 | A1* | 3/2020 | Thampy ................ H04L 41/145 |
| 2020/0136891 | A1* | 4/2020 | Mdini ..................... H04L 43/16 |
| 2021/0385135 | A1* | 12/2021 | Côté ................... H04L 41/0645 |

OTHER PUBLICATIONS

Ruiz et al., Service-triggered Failure Identification/Localization Through Monitoring of Multiple Parameters, IEEE, 3 pages, Sep. 22, 2016.*
Rafique et al., Machine Learning for Network Automation: Overview, Architecture, and Applications [Invited Tutorial], IEEE, 18 pages, Oct. 2018.*
Dusia et al, Recent Advances in Fault Localization in Computer Networks, IEEE, 22 pages, 2016.*
Musumeci et al., A Tutorial on Machine Learning for Failure Management in Optical Networks, IEEE, 15 pages, Aug. 2019.*
Josefsson, Root-cause analysis through machine learning in the cloud, University of Uppsala, 45 pages, Nov. 2017.*
Wang et al, CloudRanger: Root Cause Identification for Cloud Native Systems, IEEE, 11 pages, 2018.*
Alcatel-Lucent, Optical Management System (OMS) Release 6.3.4 Service Assurance Guide, 222 pages, Sep. 2009.*
Kyle Hsu et al., Unsupervised Learning via Meta-Learning, arXiv:1810.02334v6 [cs.LG] Mar. 21, 2019, Published as a conference paper at ICLR 2019, pp. 1-24.
Shaoqing Ren et al., Faster R-CNN: Towards Real-Time Object Detection with Region Proposal Networks, Microsoft Research, pp. 1-9.
Kaiming He et al., Mask R-CNN, Facebook AI Research (FAIR), 2017, pp. 2961-2969.
Douglas Charlton et al., Field measurements of SOP transients in OPGW, with time and location correlation to lightning strikes, Research Article vol. 25, No. 9 | May 1, 2017 | Optics Express 9689, pp. 1-8.

* cited by examiner

| | human | G-GAN, $z_1$ | G-GAN, $z_2$ | G-MLE |
|---|---|---|---|---|
| | people are on motorcycles. there are green cars behind them. the signs are all brown with chinese written on it. | men are riding on a motorcycle. the man is wearing tan boots, and a white and blue jacket with beige stripes on. the street is made of cobblestone. there are tall bright green trees on the sidewalk. | two people are riding motorcycles. there are many trees on the sidewalk. there is a red and white painted letter on the side of the ledge. tall buildings are on the background. | a man is riding a bike. there are trees on the sidewalk. there are people walking on the sidewalk. there is a tall building in the background. |
| | A baseball player is swinging a bat. He is wearing a black helmet and a black and white uniform. A catcher is behind him wearing a gray uniform. The catcher has a brown glove on his hand. Two men can be seen standing behind a green fence. | a baseball player in a white and blue uniform is holding a white bat. there is a umpire behind the batter in the blue and white uniform. he is getting ready to catch the ball. there is a crowd of people behind him watching him. | men are on a baseball field on a sunny day. the player is wearing a black and white uniform. there is a catcher behind him. the field is green with brown dirt and white shiny lines. | a baseball player is standing on a baseball field. he is wearing a blue helmet on his head. the catcher is wearing a black and gray uniform. the court is green with white lines. |

FIG. 17

IDENTIFYING AND LOCATING A ROOT CAUSE OF ISSUES IN A NETWORK HAVING A KNOWN TOPOLOGY

CROSS-REFERENCE TO RELATED APPLICATION

The present application claims the benefit of priority to Provisional Patent App. No. 62/879,055, filed Jul. 26, 2019, entitled "Applications of object recognition methods to analyze communications networks of known topology," the contents of which are incorporated by reference herein.

TECHNICAL FIELD

The present disclosure generally relates to Performance Monitoring (PM) in a network having a known topology. More particularly, the present disclosure relates to systems and methods for pattern detection in time-series data to identify and locate a root cause of one or more issues in the network.

BACKGROUND

Conventionally, performance monitoring, problem detection, and root cause analysis are performed in a manual fashion after a failure has occurred. This approach is taken across various application areas, such as manufacturing, healthcare, vehicle maintenance, airplane maintenance, building maintenance, road maintenance, infrastructure maintenance, etc. This manual approach is very expensive, time-consuming, and requires a human expert with the knowledge of the given system to debug the problem after the failure. At the same time, the number of monitors in many systems is increasing, as the Internet of Things (IoT) is now connecting devices to the network, which would not conventionally be connected or monitored. The manual approach to performance monitoring with the failure and debug cycle is not feasible. At the same time, it would be desirable to decrease the cost even in current manual approaches by introducing Machine Learning (ML) methodologies for pattern detection to enable new approaches to detecting and forecasting faults before they occur and to find patterns in time-series that can be used to pin-point the identity and location of a component that is responsible for causing the failures.

Conventionally, anomaly detection in a network is usually implemented after a failure has occurred. Specifically, following a failure in a network, an operator or technician may log into a monitoring system, perform a manual investigation, and provide remediation as needed. Of course, this approach is reactive and typically involves a traffic hit, traffic loss, protection switching, or other impactful issue in the network, followed by network maintenance. Another approach to anomaly detection is to re-implement the failure scenario via software that can run and analyze the scenario in an offline manner. For a handful of Performance Monitoring (PM) metrics relating to the problem, alarms may be raised if any given PM crosses some pre-defined threshold. This is typically achieved using a rule-based engine with hard-coded "if . . . then . . . else . . . " statements specified by a human expert.

Disadvantageously, with these conventional approaches, the reaction time is slow, engineering time is expensive, and experts are rare. Also, this approach only finds known failures that are also easy to specify. The approach presumes that the human expert is able to articulate the specific reason for a network failure and that this network failure happens due to the threshold crossing at one point. The approaches cannot and are not used to find failures that span multiple network elements, links, etc. Further, these approaches do not scale with large and complex networks. Also, these conventional approaches require a lot of expertise, work, and time to implement. Further, defining and updating complex "if . . . then . . . else . . . " rules is complicated and time-consuming, and there is limited accuracy if limited to simple rules, such as one-dimensional thresholding.

Conventional approaches using PM metrics focus on trends from individual PM metrics, such as simple linear fits and relying on subject matter experts to interpret the values of the trends. Of course, these conventional approaches do not use all available information, result in lower accuracy, and require expertise to interpret trend values.

In some fields, current approaches in pattern detection are generally limited to finding objects in images, recognizing letters, speech-to-text conversion, text or speech translation, etc. Pattern recognition in audio may have some similarities to network applications, but these approaches only ever use Recurrent Neural Networks (RNNs). The vast majority of currently published network anomaly detection algorithms are not based on ML. Typically, these approaches use Principal Component Analysis (PCA), Kernel Density Estimation (KDE), Bi-directional Generative Adversarial Networks (BiGANs), or their derivatives, to find outliers in multi-dimensional data. As shown by a large body of literature, this approach does not work with typical time-series data since the data is not stationary and the distribution at each time sample is not normally and statistically distributed.

The current known applications of machine learning can detect or predict facilities in an abnormal state, but it does not consider the fact that a single root-cause event can (and often does) affect multiple facilities at once, in cascade fashion. Combining network topological information with machine learning is currently not done in known applications. To analyze a given facility, the software applications use time-series of multiple performance monitoring measurements. This usually provides good results as long as the facility remains in the same state during an entire monitoring process. However, it does not perform as well when the facility changes state during a particular time window. Therefore, there is a need to provide ML solutions that overcome the above-mentioned deficiencies of the conventional systems.

BRIEF SUMMARY

The present disclosure explores new problem areas for Machine Learning (ML). The typical use cases in networking include forecasting threshold crossing of Performance Monitoring (PM) data, forecasting alarms, forecasting Quality-of-Experience (QoE), anomaly detection, etc. Conventionally, these use cases are addressed with regression techniques. Regression techniques are the classical "forecasting" algorithms. Forecasting algorithms require a high touch approach where an expert in the use of these algorithms is able to choose the approach best suited for the forecasting, based on their observations about the time-series. Another problem with the regression approaches is their low capacity. Capacity is informally defined as the ability of the algorithm to fit a wide variety of functions. For example, linear regression has a low capacity as it cannot fit a highly varying time-series. Also, a higher order polynomial regression will typically overfit the time-series due to its low ability to generalize.

Additionally, the present disclosure describes systems and methods for using specific types of pattern detection, such as techniques that may normally be used for object recognition applications. However, instead of using time-series data to analyze objects from an image, the embodiments of the present disclosure may further include using the data to analyze communications networks of known topology.

According to one embodiment of the present disclosure, a system may include a processing device and a memory device configured to store a computer program having instructions. When executed, the instructions may be adapted to enable the processing device to obtain information defining a topology of a multi-layer network having a plurality of Network Elements (NEs) and a plurality of links interconnecting the NEs. The instructions also enable the processing device to receive Performance Monitoring (PM) metrics and one or more alarms from the multi-layer network. Also, based on the information defining the topology, the PM metrics, and the one or more alarms, the instructions enable the processing device to utilize a Machine Learning (ML) process to identify a problematic component from the plurality of NEs and links and to identify a root cause associated with the problematic component. As such, the problematic component may be identified as the root cause of one or more issues in the multi-layer network.

According to another embodiment of the present disclosure, a method may include the step of obtaining information defining a topology of a multi-layer network having a plurality of Network Elements (NEs) and a plurality of links interconnecting the NEs. The method may also include the step of receiving Performance Monitoring (PM) metrics and one or more alarms from the multi-layer network. Based on the information defining the topology, the PM metrics, and the one or more alarms, a Machine Learning (ML) process is utilized to identify a problematic component from the plurality of NEs and links and to identify a root cause associated with the problematic components, whereby the problematic component may be identified as the root cause of one or more issues in the multi-layer network.

According to yet another embodiment of the present disclosure, a non-transitory computer-readable medium that stores computer logic is described. The computer logic may have instruction that, when executed, cause a processing device to obtain information defining a topology of a multi-layer network having a plurality of Network Elements (NEs) and a plurality of links interconnecting the NEs. The instructions also cause the processing device to receive Performance Monitoring (PM) metrics and one or more alarms from the multi-layer network. Based on the information defining the topology, the PM metrics, and the one or more alarms, the processing device is further configured to utilize a Machine Learning (ML) process to identify a problematic component from the plurality of NEs and links, where the problematic component may be identified as a root cause of one or more issues in the multi-layer network.

BRIEF DESCRIPTION OF THE DRAWINGS

The present disclosure is illustrated and described herein with reference to the various drawings, in which like reference numbers are used to denote like system components/method steps, as appropriate, and in which:

FIG. 17 is a diagram showing a chart of human-readable, meaningful descriptions of patterns using a Conditional Generative Adversarial Network (Conditional GAN) algorithm trained using different hyper-parameters, according to some embodiments.

DETAILED DESCRIPTION

Figure 1A:
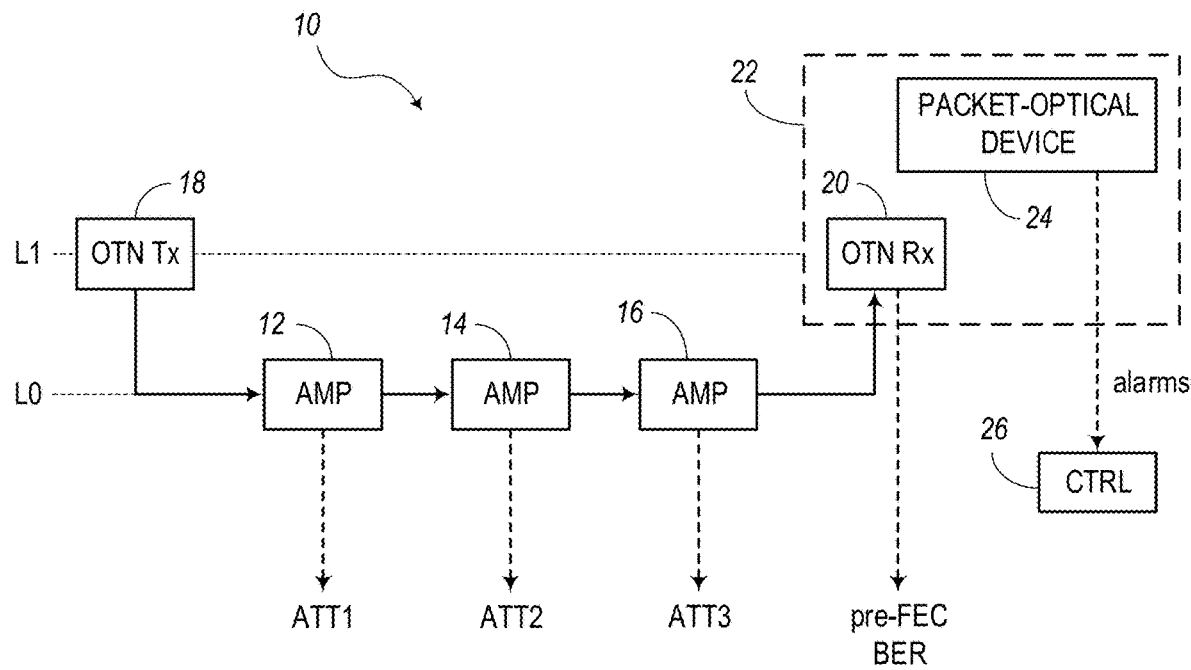
FIG. 1A is a block diagram illustrating a first section of a communications network having multiple layers and measurements obtained from different components of the communications network, according to some embodiments.

The present disclosure is directed to processing time-series data of an environment (or system) under investigation to identify and locate a component within the environment that is responsible for one or more issues in that environment. These processes are used to pinpoint a "root cause" for the one or more issues in order that remediation actions can be taken to quickly resolve the issues. Although the examples in the present disclosure are related to obtaining Performance Monitoring (PM) metrics of communications networks, it should be understood that the systems and methods of the present disclosure may also be applied to any field or environment to be monitored, such as manufacturing, healthcare, vehicle maintenance, airplane maintenance, building maintenance, road maintenance, infrastructure maintenance, etc.

Conventional systems may use a brute force approach to Machine Learning (ML) for all facilities of a network at once. However, these systems may require a long training time and large amounts of data, which would make its application unusable in many situations. For instance, traditional ML algorithms may require too much time and data to learn the topology of a communications network. To address this problem, the embodiments of the present disclosure provides a solution of treating each Network Element (NE) in the communications network independently for ML purposes. One aspect of the present disclosure is that the embodiments provide a process of assisting the ML algorithms by using the knowledge of the network topology to create algorithms that are easier to train. In addition, other solutions consider the stitched network, but do not attempt to characterize the health of the network.

With conventional solutions, affected facilities are individually reported as if they were independent events, while in fact they may originate from a single root-cause. This may create noise in the system. Furthermore, this does not capture the patterns of the multi-facilities, which contain more information and can be identified with greater precision than the simpler individual-facility patterns. In addition, even for a single facility with a high-probability of being abnormal, it is often unclear why the ML model predicted the abnormality state, in particular when the pattern was detected across multiple PM metrics and across multiple facilities/layers.

At the other extreme, if using as an input a fully stitched network with many facilities and trying to characterize the full network with a single pattern-classification, the interpretation of the results would be ill-defined since some parts of the network may be normal and some may be abnormal, for a variety of reasons, hence making it difficult to characterize the full network with a single category. The same problem occurs when trying to characterize a facility that has been in multiple different states during a time period.

Thus, the embodiments of the present disclosure are configured to overcome these obstacles. The systems and methods described herein are configured to solve the problem of locating root issues in a scalable way. By using ML, the embodiments of the present disclosure are able to provide predictions having better precision and better coverage compared to non-ML systems.

The present disclosure describes systems and methods for solving the problem of identifying and/or locating the root-cause or root issues in communications networks. Although at least two examples of different methods for identifying/locating root issues are described herein, it should be noted that one or skill in the art will recognize that other related solutions may be contemplated within the spirit and scope of the present disclosure. The solutions described herein may be configured to address the scalability problem that inevitably occurs when communications networks get large and contain numerous NEs.

Some embodiments may include splitting a network by NEs and analyzing time-series data of the individual NEs in parallel. Although these methods may be scalable, they may not be configured to recognize when the symptoms reported by multiple NEs originate from a single common problem. Hence, although useful in their own right, they may be limited by their inability to locate a root issue. In the present disclosure, the various embodiments solve the root issue identifying problem by considering all NEs simultaneously and by processing the network topology information (e.g., using ML). Two different methods, among others, of solving this problem with ML may include 1) using a single ML model for the entire communications network (e.g., using an ML approach similar to an object recognition algorithm), and 2) using multiple ML models (one per NE) combined hierarchically (e.g., using an ML approach with a correlation of alarms). The methods may also generate human-readable text for describing the above findings in natural language.

Data Input

Input data may be obtained in a way that is similar to known network assurance applications. Performance Monitoring (PM) metrics (e.g., signal strength, power, etc.) may be obtained from Layer 0 (e.g., physical layer, optical layer) components. PM metrices (e.g., pre-Forward Error Correction (FEC) Bit Error Rate (BER), etc.) may be obtained from Layer 1 components. PM metrics (e.g., received/transmit/discarded frames, etc.) may be obtained from Layer 2 components. Also, PM metrics (e.g., latency, jitter, etc.) may be obtained from Layer 3 components. In addition to PM metrics, the systems of the present disclosure may be configured to obtain "alarms" signifying various states of conditions of the communications network. Various Layer 0-3 alarms may include "Loss of Signal," "Channel Degrade," "High Fiber Loss," "High Received Span Loss," "Optical Line Fail," "Shutoff Threshold Crossed," etc. Data input may also be obtained for determining the topology of the multi-layer communications network. The topology, for example, may include physical connectivity of devices, logical paths across multi-layer routes, etc.

"Atomic" NEs and "Composite" Structures

Generally speaking, a communications network is built using multiple technologies, which in many cases create underlay/overlay layers. An overlay layer depends on the services of its underlay layer. The "atomic" NEs are the most granular components of the underlay layer for the problem under consideration. They typically report PM metrics and Alarms directly. Examples of atomic NE may include, for example, a single port, a single Optical-channel Transport Unit (OTU), and amplifier (AMP) facility, or other devices.

The composite structures are part of the overlay layer and are made up of several atomic elements. They typically report end-to-end PM and Alarms in the context of the overlay layer. Examples of composite structures may include, for example, a Layer 2 or Layer 3 service (e.g., Ethernet (ETH) service, Internet Protocol (IP) service, etc.) composed of several Layer 1 hops between devices (e.g., Optical-channel Data Unit (ODU) device, OTU device, etc.) or a Layer 1 service (e.g., OTU) composed of several Layer 0 spans (e.g., AMP).

Generalizing further, higher-order structures can be constructed from other composite structures of the underlay layer if needed. In all these cases, the topology information is explicitly used to reconstruct composite structures from atomic NEs during data pre-processing.

Labelling of "Atomic" NEs and "Composite" Objects

Data labelling, in many cases, may be a non-trivial process, but is typically needed for a supervised ML application. For a classifier algorithm, the labels teach the algorithm about the different categories of data. For example, a classifier can learn to differentiate problematic vs normal NEs, or to identify different types of issues (e.g., fiber issue, modem issue, amplifier issue, client-side issue, etc.). Atomic NEs can be labeled by automated expert rules after-the-fact (e.g., after determining that an Un-Available Seconds (UAS) metric is greater than zero for an ETH device or ODU, after determining that a High Correction Count Second (HCCS) metric is greater than 0 for an OTU, or other conditions).

Composite structures can be labeled directly from overlay metrics (e.g., Loss of Signal alarm for an ETH service), but topology information enables additional "cross-layer labelling" strategies which can be exploited by the systems of the present disclosure. For example, the embodiments of the systems and methods of the present disclosure may be configured to a) label an AMP according to the signal-to-noise ratio of its overlaid OTN service, b) label an ODU facility according to delay and jitter of its overlaid IP/MPLS tunnel, c) label traffic flows (e.g., netflow, sflow) according to packet drops of underlay switches, and/or performing other labelling processes, which is described in the present disclosure, such as by using the embodiments illustrated in FIGS. 1A and 2A. Furthermore, "composite" labels can be defined from a combination of underlay (atomic) and overlay (composite) metrics (e.g., loss of signal from one client-port of a packet-optical card, but no error from a line-port). These labels can be used for at least the two methods described below.

Figure 1B:
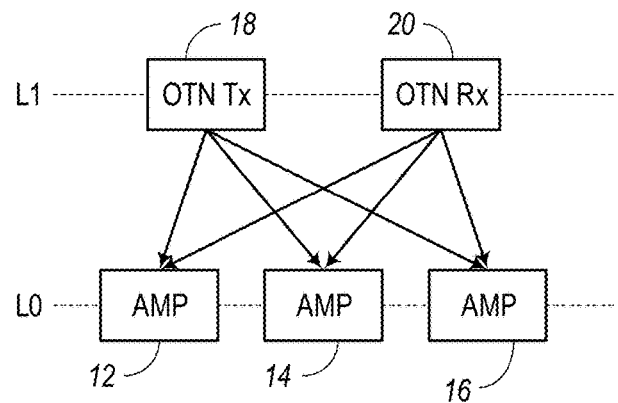
FIG. 1B is a block diagram illustrating dependencies of components across multiple layers of the communications network of FIG. 1A, according to some embodiments.

FIG. 1A is a diagram showing the topology of a section of a communications network 10 according to one embodiment. FIG. 1B is a dependency graph of the communications network 10. The exemplary communications network 10 includes a first layer (e.g., Layer 0) having AMP 12, AMP 14, and AMP 16. A second, overlaid layer (e.g., Layer 1) includes an Optical Transport Network (OTN) transmitter 18 and an OTN receiver 20. The OTN receiver 20 may be part of a device (e.g., switch, router, server, shelf, node, etc.) 22 having a packet-optical device 24.

During operation of the communications network 10, various PM metrics may be obtained from the different components over time. For example, the AMPs 12, 14, 16 may be configured to provide attenuation metrics ATT1, ATT2, ATT3, respectively. In Layer 1, the OTN receiver 20 may be configured to provide a pre-FEC BER metric. Also, the packet-optical device 24 may be configured to analyze conditions of the device 22 and provide alarm signals to a control (CTRL) device 26. The CTRL device 26 may be configured in a control plane of the communications network 10 for monitoring the various PM metrics and alarms from the various components and/or sensors.

The CTRL device 26 may be configured to utilize various processes (e.g., ML processes) for performing Root Cause Identification (RCI) with network time-series object detection to determine the root cause of one or more issues in the communications network 10. For example, determining the root cause may include identifying one or more components (or fiber links connecting these components) that causes the communications network 10 to operate in a below-optimal manner. Determining the root cause may also include finding the location of the one or more problematic components. The embodiments of the present disclosure may rely on Machine Learning (ML) for performing RCI with the input time-series data obtained from the communications network 10.

By way of example, FIG. 1A shows the communications network 10 with fiber spans connecting AMPs 12, 14, 16. The fiber spans carry optical signals with a Layer 1 OTN service. Network Elements (NEs) are instrumented to collect information at various layers, which can be correlated with the network topology. In particular, the AMPs 12, 14, 16 are able to measure the difference between in the input and output power levels and infer the attenuation on their preceding fiber. The OTN receiver 20 is able to count the number of incorrectly received frames and infer the Bit Error Rate (BER) on the fiber path. The packet-optical device 24 (with the OTN receiver 20) is configured to report alarms if too many frames are lost in a period of time (e.g., UAS counts/measurements/alarms).

The topology in FIG. 1A can be used to derive the dependency graph of FIG. 1B for the communications network 10 using any suitable network analytics technique. With respect to FIGS. 1A and 1B, the Root Cause Identification (RCI) process may include the following: Upon receiving an alarm generated by the OTN receiver 20, the packet-optical device 24 may be configured to identify which amplifier on its path is causing a decrease in BER. As a result of this detection, the packet-optical device 24 provides an alarm, which the CTRL device 26 is configured to address. Although stated in simple terms herein, conventional systems are unable to solve this problem in a cost-effective way and may experience challenges address the problem.

Figure 2A:
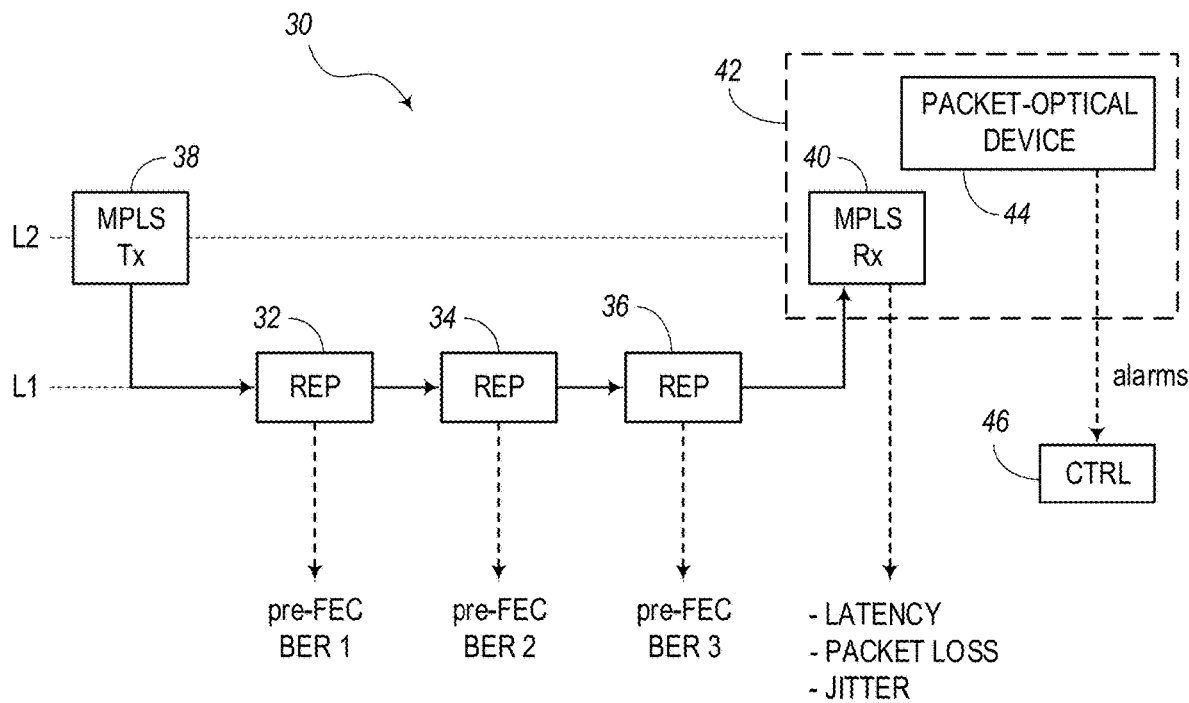
FIG. 2A is a block diagram illustrating a second section of a communications network having multiple layers and measurements obtained from different components of the communications network, according to some embodiments.
Figure 2B:
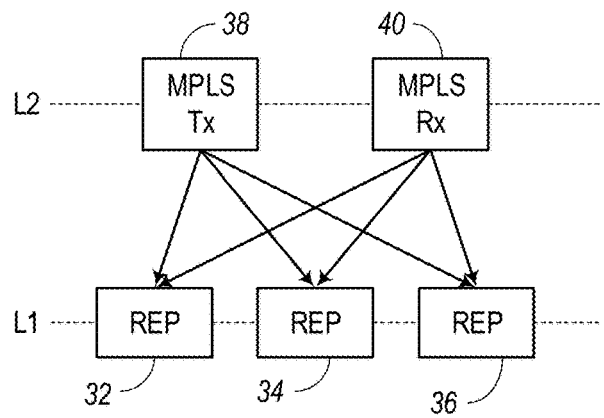
FIG. 2B is a block diagram illustrating dependencies of components across multiple layers of the communications network of FIG. 2A, according to some embodiments.

FIGS. 2A and 2B (similar to FIGS. 1A and 1B in many ways) show an embodiment of another section of a communications network 30 and dependencies. In this embodiment, an underlaid Layer 1 is shown with an overlaid Layer 2. The communications network 30 includes Layer 1 devices, such as optical repeaters (REPs) 32, 34, 36. Layer 2 devices include a Multi-Protocol Label Switching (MPLS) transmitter 38 and an MPLS receiver 40. The MPLS receiver 40 may be part of a device (e.g., switch, router, server, shelf, node, etc.) 42 having a packet-optical device 44 that is configured to provide alarms to a CTRL device 46. In some embodiments, the CTRL device 26 shown in FIG. 1A may be the same device as the CTRL device 46 shown in FIG. 2A. Also, in some embodiments, devices 22 and 42 may be the same device and packet-optical devices 24 and 44 may be the same device.

The optical repeaters REPs 32, 34, 36 may be configured to provide output signal of PM metrics, such as pre-FEC BER 1, pre-FEC BER 2, and pre-FEC BER 3, respectively. These can be used to infer channel Signal-to-Noise Ratio (SNR). The MPLS receiver 40 may be configured to output metrics related to latency, packet loss, jitter, etc.

In this example, FIG. 2A shows the communications network 30 with fiber spans connecting the REPs 32, 34, 36 (e.g., using pluggable optical devices). The fibers may be configured to carry one or more MPLS packet services. NEs are instrumented to collect information at various layers, which can be correlated with the network topology. In particular, the REPs 32, 34, 36 may be configured to count the number of incorrectly received frames and infer the BER on the fiber span. The MPLS receiver 40 may be configured to receive the packets and measure end-to-end Quality of Service (QoS), latency, packet loss, jitter, and/or other metrics. The MPLS receiver 40 may be placed in the device 42 (e.g., shelf), where the packet-optical device 44 is configured to report alarms if a QoS parameter does not meet a minimum QoS threshold.

Overcoming the RCI Challenge

The embodiments of FIGS. 2A and 2B may be used in a method for RCI utilizing time-series data obtained from the communications network 30. As suggested above, conventional systems may struggle with addressing the challenge of identifying a root cause. To understand why the problem is challenging, it is important to understand how RCI is typically performed and why ML cannot be used in conventional systems to directly solve the problem. This section reviews traditional approaches to the problem and points out their deficiencies.

RCI is normally a highly manual problem-solving technique. Imagine a network operator receiving an alarm about a service (e.g., a service associated with the OTN receiver 20 shown in FIG. 1A) and wanting to know where in the communications network 10 the problem originated. Using the topology and the dependency graph FIG. 1B, the operator may be able to determine a "set" of network devices (e.g., the set consisting of AMPS 12, 14, 16) that may be involved in the problem. However, to actually identify a single one of those devices, the operator would need to go through the measurements obtained from those devices (i.e., ATT1, ATT2, ATT3). This would require the operator to visually look for a pattern of behavior in the time-series data that caused the problem at the OTN receiver 20. This conventional approach is very costly for identifying or fixing the problem and would normally occupy a large amount of time for today's network operators.

One may think that the manual portions of RCI could be automated with a Machine Learning (ML) system trained to recognize the pattern that is causing the problem and use that system to determine which device has caused the problem. However, simply integrating ML overlooks the fact that labels are required to train a ML model. Thus, the manual task that was normally performed by the network operator has then been transitioned to a label maker. Obtaining labels makes the problem highly manual as it is the network operator, or another highly paid expert, who would need to go over the time-series data and label the patterns causing the problems. In essence, the work that made the problem costly in the first place is still there, even if ML were to be used for RCI. However, as described in the present disclosure, embodiments are provided that overcome the difficulties of the conventional approaches.

Data Pre-Processing

Figure 3A:
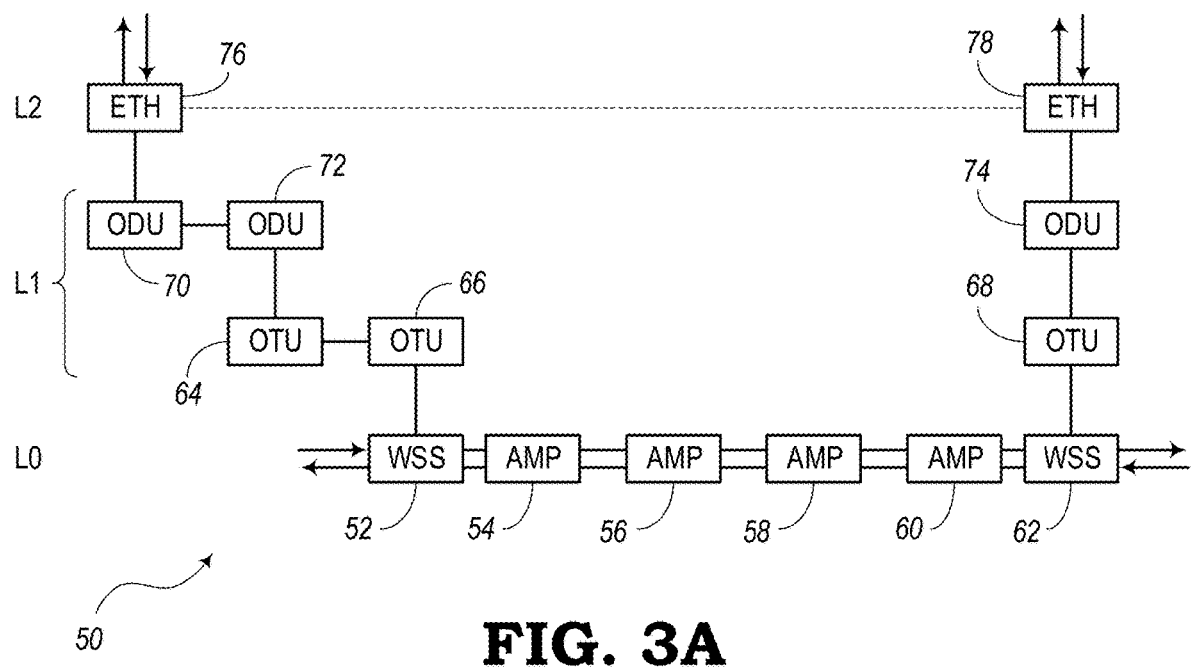
FIG. 3A is a block diagram illustrating a third section of a communications network having multiple layers, according to some embodiments.

FIG. 3A shows the topology of another section of a communications network 50 having multiple layers. In this embodiment, the communications network 50 includes a Wavelength Selective Switching (WSS) device 52, AMPs 54, 56, 58, 60, and WSS device 62 in a first layer (i.e., Layer 0). A second layer (i.e., Layer 1) may include OTN devices, such as OTU devices 64, 66, 68 and ODU devices 70, 72, 74. A third layer (i.e., Layer 2) may include ETH devices 76, 78.

The knowledge of network topology is used to build data structures from chains of inter-connected devices, while ignoring the vast majority of "combinational" device-to-device possibilities to avoid a brute force process of trying all combinations. In other words, the topology information can be discovered and then explicitly used to reconstruct composite structures from atomic NEs. To be used by ML, input data structure can be a vector or matrix of PMs and Alarms, joined with labels as described above. The structures provide an aggregated characterization of composite structures. The labels define a limited number of object classes.

Method 1: Single ML Model

Figure 3B:
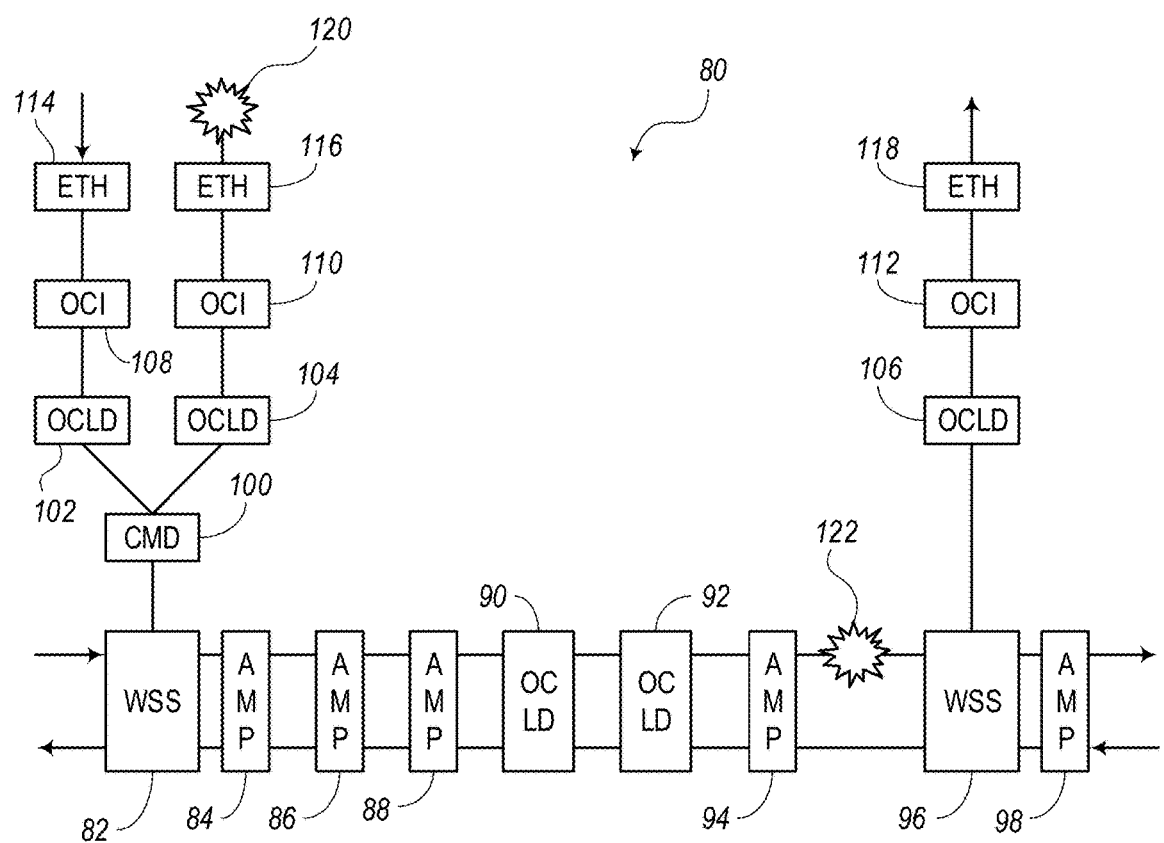
FIG. 3B is a block diagram illustrating a fourth section of a communications network having multiple layers and two different issues in the communications network, according to some embodiments.

FIG. 3B is a diagram of a section of a multi-layer communications network 80, where the section includes an example of two different issues. The communications network 80 includes a WSS device 82, AMPs 84, 86, 88, Optical Channel Laser Detector (OCLD) devices 90, 92, AMP 94, WSS device 96, and AMP 98 on Layer 0 (L0). A Channel Multiplexer/Demultiplexer (CMD) device 100 is shown on Layer 1 (L1). OCLD devices 102, 104, 106 are shown on Layer 2 (L2). Optical Channel Interface (OCI) devices 108, 110, 112 are shown on Layer 3 (L3). Also, Ethernet (ETH) devices 114, 116, 118 (e.g., 10 Gigabit Ethernet (ETH10G) ports) are shown on Layer 4 (L4). The multiple components are connected across the multiple layers (L0-L4).

Figure 12:
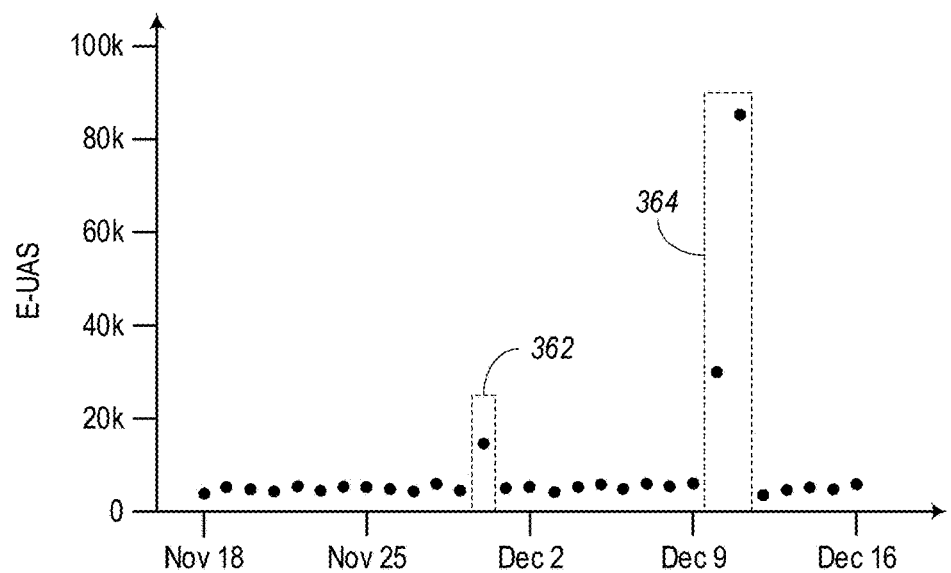
FIG. 12 is a graph illustrating an example of measuring for identifying an issue of Ethernet Un-Available Seconds (E-UAS) plotted over time at an Ethernet port in a communications network, according to some embodiments.

Complex networks, such as the example of the section of the multi-layer communications network 80 of FIG. 3B, are regularly affected by a variety of issues that disturb parts (but not all) of the network. In order to maintain good Quality of Service (QoS), network operators strive to fix these issues as quickly as possible. When a problem occurs, components of the network change from normal to abnormal states, and vice versa, over time, as illustrated in FIG. 12. Software applications may use Big Data and ML techniques to identify and classify network issues automatically and help with pro-active remediation process. With a ML model trained, the software applications can then utilize current data to predict when an issue is imminent. In the example of FIG. 3B, two issues (e.g., faults, failures, line breaks, etc.) 120, 122 are shown.

In some embodiments, the ML algorithms may utilize a process that is similar to object recognition algorithms for processing two-dimensional image data to determine the identity of objects within the image. For example, object recognition processes may be configured to distinguish the image of a cat from the image of a dog using certain patterns within the image. The object recognition techniques of the present disclosure can be used to determine if there are abnormalities (i.e., problems, issues, subpar performance, etc.) in the network (e.g., the section of the communications network 80), and/or abnormalities in individual elements in the section. Using such techniques, it can be determined if the elements "look" normal. While the entire network can be classified, each individual element of the section of the communications network 80 can also be classified. As described herein, normal is indicative of typical operating behavior with no anticipated alarms, degradation in service or quality, etc. Object recognition methodologies are described in more detail with respect to FIGS. 13 and 14.

In the embodiments of the present disclosure, "object recognition" boxes identifying various NEs are analyzed by the stitched network to leverage the images to a known index to connect multiple images together. When there is an issue in the analyzed network, at least one box (possibly several boxes) will be affected by the issues. The NEs may be affected by the same root cause. Thus, there may be one "image" representing the entire section of the communications network 80 and several boxes of individual components (e.g., viewed as multiple objects in the image). The issues 120, 122 may correspond to anomalies in the section of the network, which may be affected by the same root cause.

The object recognition algorithm may include a stitched network as an input, not just individual boxes. The stitched network (e.g., communications network 80) includes multiple devices operating at multiple layers (e.g., optical, packet, etc.). The output includes the multiple objects within that network. The process can also be generalized over time, where one time is depicted in FIG. 3B. This can also be seen as a snapshot or picture and may include multiple snapshots over time. As an example, there may be an issue at a given object at a given place and at a given time. Instead of a one-dimensional time-series, however, the object recognition may utilize multi-dimensional time-series data.

The systems (e.g., CTRL devices 26, 46) can look at time-series data coming in from one entity in the network. This can be converted to an image, such that object detection can be used on the image to find anomalies in the time-series. In addition, as described below, the systems may operate on multiple sources of time periods coming in from the network. The present systems and methods are capable of detecting multiple issues happening simultaneously from multiple elements in the network at the same time. There may be multiple sets of time periods and these can be combined into an analysis system when objects are detected for each of these objects.

One solution may include taking two time-series sets of data from the network and convert this data to images. Then, the system can place these images on top of one another. At this point, a third resulting image having two objects coming from the two time-series is obtained. Another solution is to perform object detection on each image separately and then combine the results of the two object detection results from each image coming in from the network.

Figure 4:
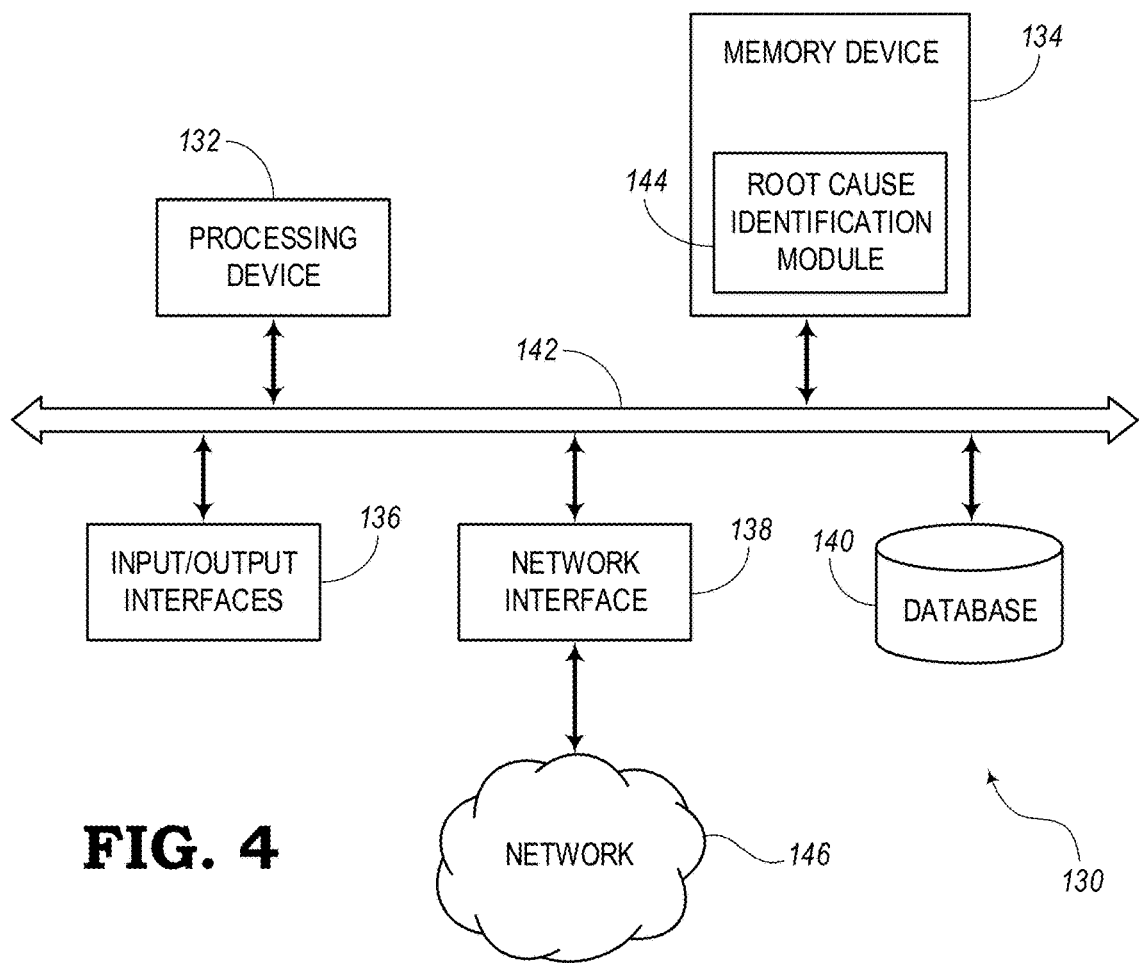
FIG. 4 is a block diagram of a server which may be used to identify and/or locate a root cause of one or more issues in a network, according to some embodiments of the present disclosure.

FIG. 4 is a block diagram of a server 130 which may be used to implement the systems and methods described herein. The server 130 may be a device (e.g., control CTRL devices 26, 46) operating in a control plane of a communications network for obtaining time-series data from the network and processing the data to train a ML model for identifying and locating a root cause (or primary problematic device) of one or more issues in the network. Also, the ML model can then analyze current data to predict when issues may arise again or when the problematic device may cause additional issues.

The server 130 can implement the various processes associated with the systems and methods described herein. The server 130 may be a digital computer that, in terms of hardware architecture, generally includes a processing device 132, memory device 134, input/output (I/O) interfaces 136, a network interface 138, and a database 140. It should be appreciated by those of ordinary skill in the art that FIG. 4 depicts the server 130 in an oversimplified manner, and practical embodiments may include additional components and suitably configured processing logic to support known or conventional operating features that are not described in detail herein. The components (132, 134, 136, 138, 140) are communicatively coupled via a local interface 142. The local interface 142 may be, for example, but not limited to, one or more buses or other wired or wireless connections, as is known in the art. The local interface 142 may have additional elements, which are omitted for simplicity, such as controllers, buffers (caches), drivers, repeaters, and receivers, among many others, to enable communications. Further, the local interface 142 may include address, control, and/or data connections to enable appropriate communications among the aforementioned components.

The processing device 132 is a hardware device for executing software instructions. The processing device 132 may be any custom made or commercially available processor, a central processing unit (CPU), an auxiliary processor among several processors associated with the server 130, a semiconductor-based microprocessor (in the form of a microchip or chip set), or generally any device for executing software instructions. When the server 130 is in operation, the processing device 132 is configured to execute software stored within the memory device 134, to communicate data to and from the memory device 134, and to generally control operations of the server 130 pursuant to the software instructions. The I/O interfaces 136 may be used to receive user input from and/or for providing system output to one or more devices or components.

The network interface 138 may be used to enable the server 130 to communicate over a network, such as the Internet, a wide area network (WAN), a local area network (LAN), and the like, etc. The network interface 138 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 138 may include address, control, and/or data connections to enable appropriate communications on the network. The database 140 may be used to store data. The database 140 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the database 140 may incorporate electronic, magnetic, optical, and/or other types of storage media. In one example, the database 140 may be located internal to the server 130 such as, for example, an internal hard drive connected to the local interface 142 in the server 130. Additionally, in another embodiment, a data store or database may be located external to the server 130 such as, for example, an external hard drive connected to the I/O interfaces 136 (e.g., SCSI or USB connection). In a further embodiment, a data store or database may be connected to the server 130 through a network, such as, for example, a network attached file server.

The memory device 134 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory device 134 may incorporate electronic, magnetic, optical, and/or other types of storage media. Note that the memory device 134 may have a distributed architecture, where various components are situated remotely from one another but can be accessed by the processing device 132. The software in memory device 134 may include one or more software programs, each of which includes an ordered listing of executable instructions for implementing logical functions. The software in the memory device 134 includes a suitable operating system (O/S) and one or more programs, such as the root cause identifying module 144. The O/S essentially controls the execution of other computer programs, such as the root cause identifying module 144, and provides scheduling, input-output control, file and data management, memory management, and communication control and related services. The one or more programs (e.g., including at least the root cause identifying module 144) may be configured to implement the various processes, algorithms, methods, techniques, etc. described herein.

For example, the root cause identifying module 144 may be configured to enable the processing device 132 to obtain information defining a topology of a multi-layer network having a plurality of Network Elements (NEs) and a plurality of links interconnecting the NEs. Then, the root cause identifying module 144 may be configured to enable the processing device 132 to receive Performance Monitoring (PM) metrics and one or more alarms from the multi-layer network. Based on the information defining the topology, the PM metrics, and the one or more alarms, the processing device 132, as instructed by the root cause identifying module 144, may be configured to utilize a Machine Learning (ML) process to identify a problematic component from the plurality of NEs and links. The ML process may also identify a root cause of one or more issues in the multi-layer network, whereby the root cause may be identified as being associated with the problematic component.

Furthermore, the root cause identifying module 144 may enable the processing device 132 to utilize the ML process by using a single ML model for the entire multi-layer network. The single ML model may be configured to utilize a technique similar to an object recognition technique. Specifically, the single ML model may be configured to treat a condition of the multi-layer network as a two-dimensional snapshot and to utilize an object recognition technique on a plurality of two-dimensional snapshots obtained over time.

The step of utilizing the ML process may include the steps of: a) utilizing a plurality of ML models, each ML model corresponding to a respective NE, and b) hierarchically combining results from the plurality of ML models. The ML process may be configured to generate human-readable text to describe the problematic component. For example, the ML process may include an explanation generator configured to generate human-readable text describing the problematic component, whereby the human-readable text may include an explanation that provides insight for remediating the root cause or problematic component. Furthermore, the ML process may also include a discriminator trained jointly with the explanation generator in an adversarial manner, the discriminator configured to predict if a pattern corresponds to a description from a human or the explanation from the explanation generator.

The ML process may utilize a ML model that is trained using a supervised classifying process for labelling data to teach a classifier to differentiate between problematic components and normal components and to identify different types of potential issues in the multi-layer network. The supervised classifying process may include cross-layer labelling. The cross-layer labelling may include: labelling an amplifier according to a Signal-to-Noise Ratio (SNR) of an overlaid Optical-channel Transport Network (OTN) service, labelling an Optical-channel Data Unit (ODU) facility according to delay and jitter of an overlaid Internet Protocol (IP) or Multi-Protocol Label Switching (MPLS) tunnel, labelling traffic flow according to packet drops of underlaid switches, and/or labelling overlay metrics according to a Loss of Signal (LoS) on a port of a packet-optical module when there is no error on a line-port.

Each of the plurality of NEs may include a single port, a single Optical-channel Transport Unit (OTU) on the port, or an amplifier connected to the port. The plurality of NEs may be arranged in an underlay layer of the multi-layer network, and the multi-layer network may include a composite structure arranged in an overlay layer. The PM metrics may include optical power, pre-Forward Error Correction Bit Error Rate (pre-FEC BER), received discarded frames, transmitted discarded frames, latency, and/or jitter. The one or more alarms may include Loss of Signal (LoS), channel degrade, high fiber loss, high received span loss, optical line failure, and/or shutoff threshold crossed.

It will be appreciated that some embodiments described herein may include one or more generic or specialized processors ("one or more processors") such as microprocessors; Central Processing Units (CPUs); Digital Signal Processors (DSPs): customized processors such as Network Processors or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 5A:
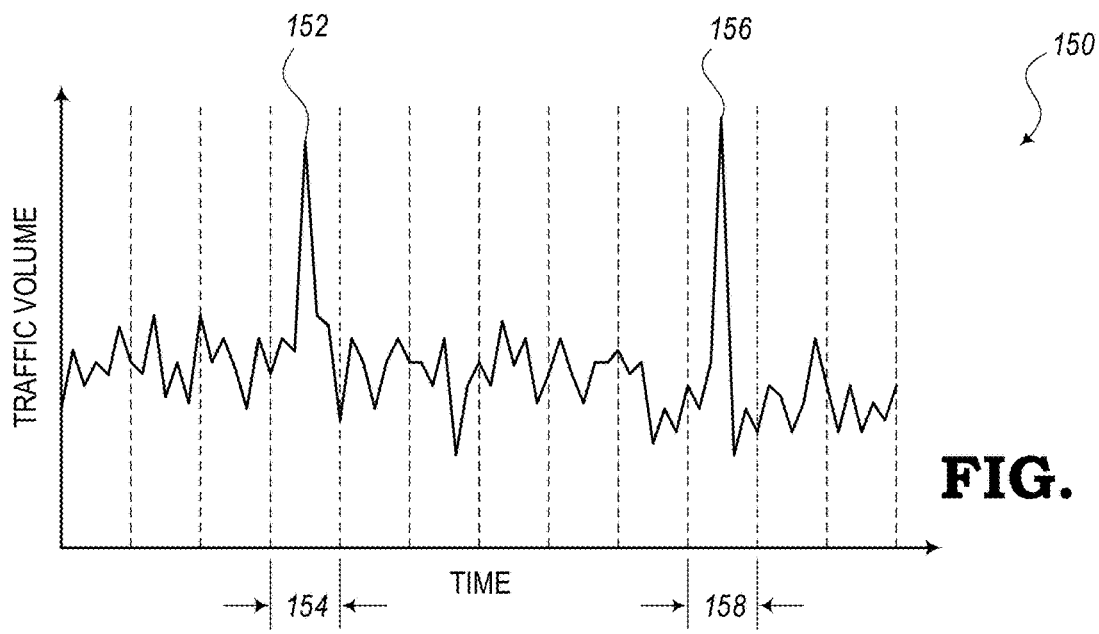
FIG. 5A is a graph illustrating an example of traffic volume of a communications network plotted over time to show network anomalies, according to some embodiments.

FIG. 5A is a graph 150 of traffic volume plotted over time. In this example, the graph 150 shows a first anomaly 152 (e.g., high traffic volume) during one time window 154 and also shows a second anomaly 156 during another time window 158. Pattern detection is trained with historical data and anomalies can be identified and labeled. For example, windows 154, 158 may be labeled as "yes" to indicate the existence of an anomaly while other windows may be labeled as "no" to indicate an absence (or non-existence) of an anomaly. Multiple anomaly types can be encoded by using more than the binary classifier (i.e., "yes" or "no"). In some cases, multiple anomaly types can be detected in the same windows to indicate other types of anomalies or other patterns.

Figure 5B:
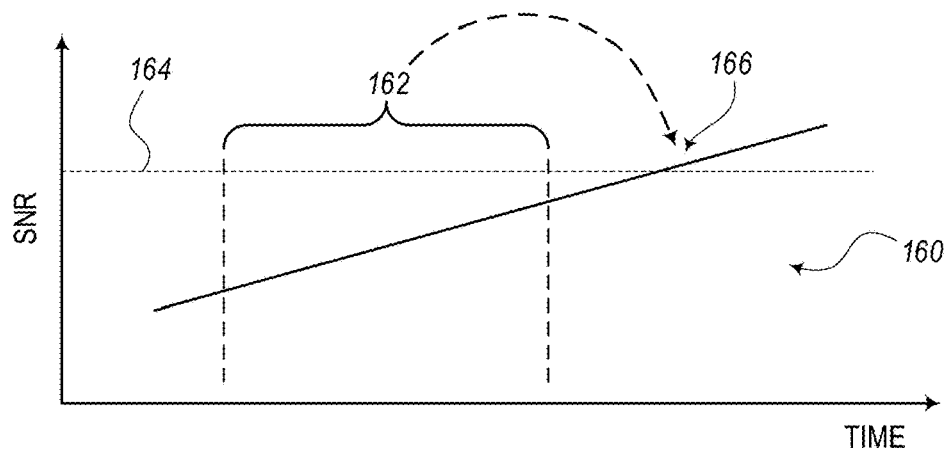
FIG. 5B is a graph illustrating an example of Signal-to-Noise Ratio (SNR) plotted over time to enable a pattern detection process to predict threshold crossings, according to some embodiments.

FIG. 5B is a graph 160 of Signal-to-Noise Ratio (SNR) over time, which may be used for predicting threshold crossings utilizing a pattern detection procedure. Time-series data of SNR measurements may be obtained over time. A pattern detection model, which has been trained from historical training data, can be used with new data over an observation window 162 for predicting when the SNR curve may likely cross over a threshold 164. Using the pattern detection model, new data can be plotted, and patterns may be detected to predict at what point 166 in the future the SNR may cross the threshold 164. Pattern detection may include analyzing an upward slope pattern or other curve characteristic during the observation window 162 to predict a future result, such as a threshold crossing at point 166.

Figure 5C:
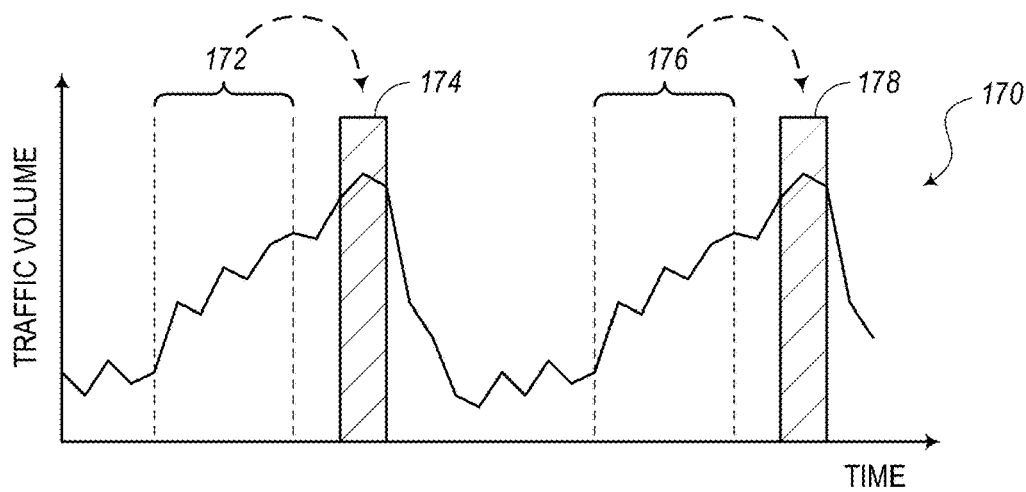
FIG. 5C is a graph illustrating an example of traffic volume plotted over time to enable a pattern detection process to predict congestion in the communications network, according to some embodiments.

FIG. 5C is a graph 170 of traffic volume (e.g., in a communications network) over time, which may be used for predicting congestion with pattern detection. The data may be analyzed during an observation window 172 with pattern detection processes for predicting a congestion event 174 (e.g., when traffic volume exceeds a threshold for an extended length of time). Pattern detection is trained with traffic measurements (or CPU utilization measurements) and labeled on the graph 170 as patterns during periods corresponding to the observation windows 172, 176 that represent a "start of busy period," which may be indicative of or may result in the congestion event 174, 178, respectively, in the future. One set of data (e.g., queue sizes) can be used for measurements, while another (e.g., end-to-end performance) can be used to generate labels (e.g., "congestion" or "no congestion"). Patterns can then be further correlated with the network at the time for root cause analysis. Congestion events 174, 178 can be periods of time when packets are dropped or latency increases beyond a bound. In a virtualized network setting (e.g., 5G), CPU utilization may be a greater indicator of congestion events 174, 178 than packet queues. Traffic other than packet data can be used to detect congestion events 174, 178 such as video re-buffering events at a player device (e.g., User Equipment (UE)).

Figure 5D:
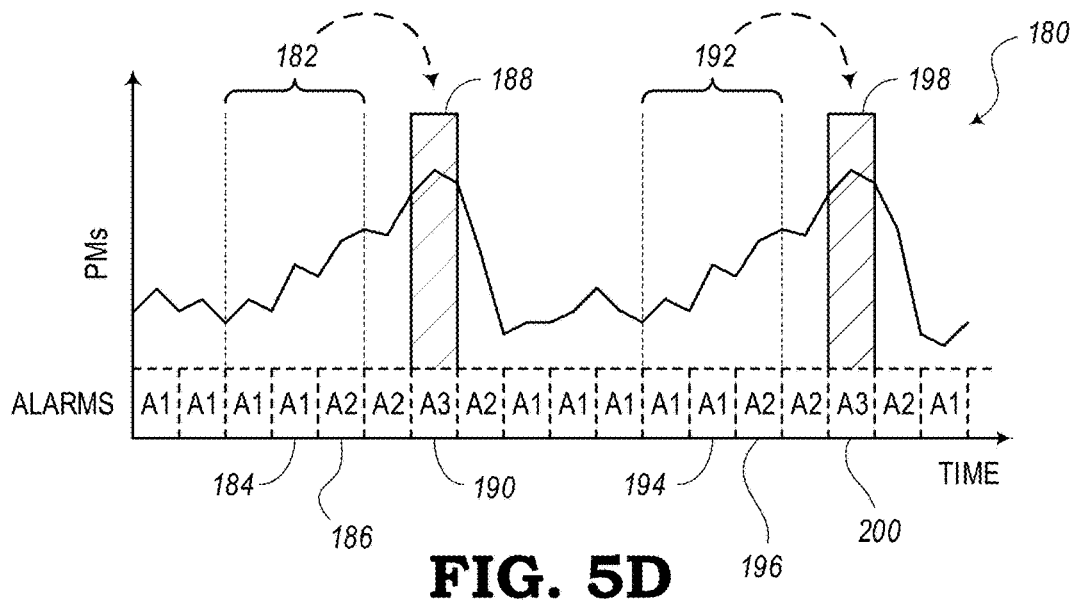
FIG. 5D is a graph illustrating a Performance Monitoring (PM) metric plotted over time to enable a pattern detection process to predict critical alarm conditions in the communications network, according to some embodiments.

FIG. 5D is a graph 180 of PM metrics over time, where the PM metrics may be related to possible alarm conditions. The graph 180 may be used for predicting critical alarm conditions with pattern detection. Data in the graph 180 may be used for predicting alarms before they happen. Pattern detection may be trained with traffic measurements and labeled as patterns (e.g., windows A1, A2, A3, representing varying levels of alarm or urgency). It may be noted that some low alert windows A1 may be followed by higher alert windows A2, the pattern of which can be detected for predicting a more extreme condition (e.g., alarm A3).

The changes may be observed during observation window 182 (e.g., transitioning from one A1 period 184 to one A2 period 186) in the PM activity. This pattern may be analyzed in pattern detection analysis to predict a start of congestion in the future, corresponding to alarm A3 condition 188 during critical alarm period 190. Also, during window 192, a transition from an A1 period 194 to an A2 period 196 can be observed and used to predict a future alarm condition 198 during period 200. One set of data (e.g., queue sizes) can be used for measurements, while another (e.g., end-to-end performance) can be used to generate labels. Patterns can then be further correlated with the network at the time for root cause analysis.

By analyzing the data shown in the graph 180 of FIG. 5D, the systems and methods of the present disclosure may be configured to label network time-series data with alarm data. A solution includes obtaining labels automatically with alarm data as an indication that something has gone wrong and then labelling the portion of the time-series obtained before the alarm as where the pattern causing the problem exists. While this approach automates the labelling of time-series, it may only work for a time-series collected from one element and the alarms collected by the same element. However, the approach may not be able to provide labels when multiple network elements cause the alarm for pinpointing which network element is causing the alarm, whereby utilizing ML in this case may also not point to the actual root cause of the problem when more than one network element is the cause of the problem.

Figure 6A:
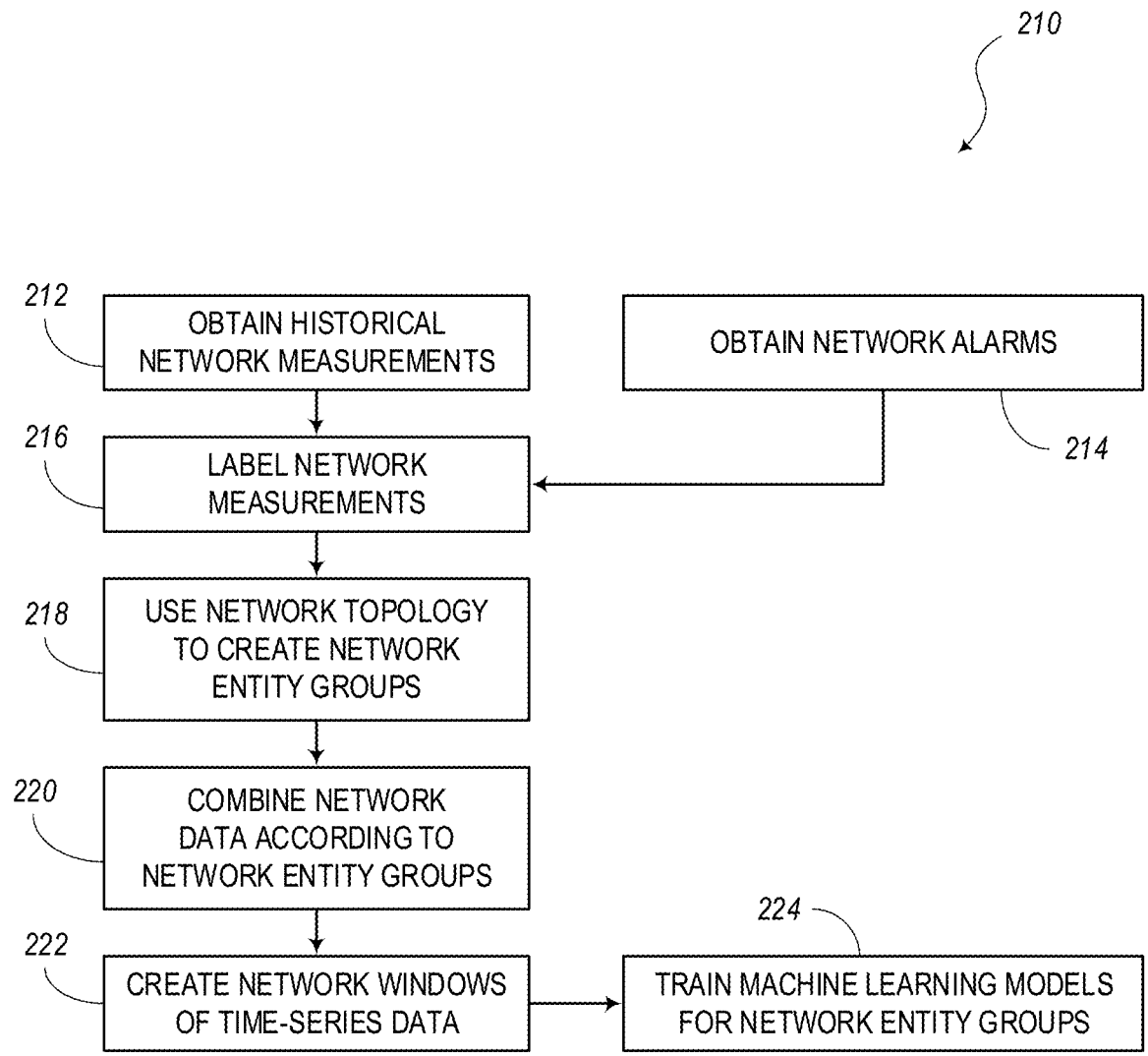
FIG. 6A is a flow diagram illustrating a training process for training a Machine Learning (ML) model to identify a root cause of one or more issues in a communications network from historic time-series data obtained from the communications network, according to some embodiments.

FIG. 6A is a flow diagram showing an embodiment of a method 210 for training a ML model for root cause identification by using network time-series data. The method 210 includes obtaining historical network measurements (as indicated in block 212) and obtaining network alarms (as indicated in block 214). Using the historical network measurements and network alarms, the method 210 includes labelling network measurement, as indicated in block 216. The method 210 also includes using network topology to create network entity groups, as indicated in block 218. The network data is then combined according to the network entity groups (block 220). Then, the method 210 includes creating network windows of the time-series data, as indicated in block 222. ML models are trained (block 224) for the network entity groups.

Figure 6B:
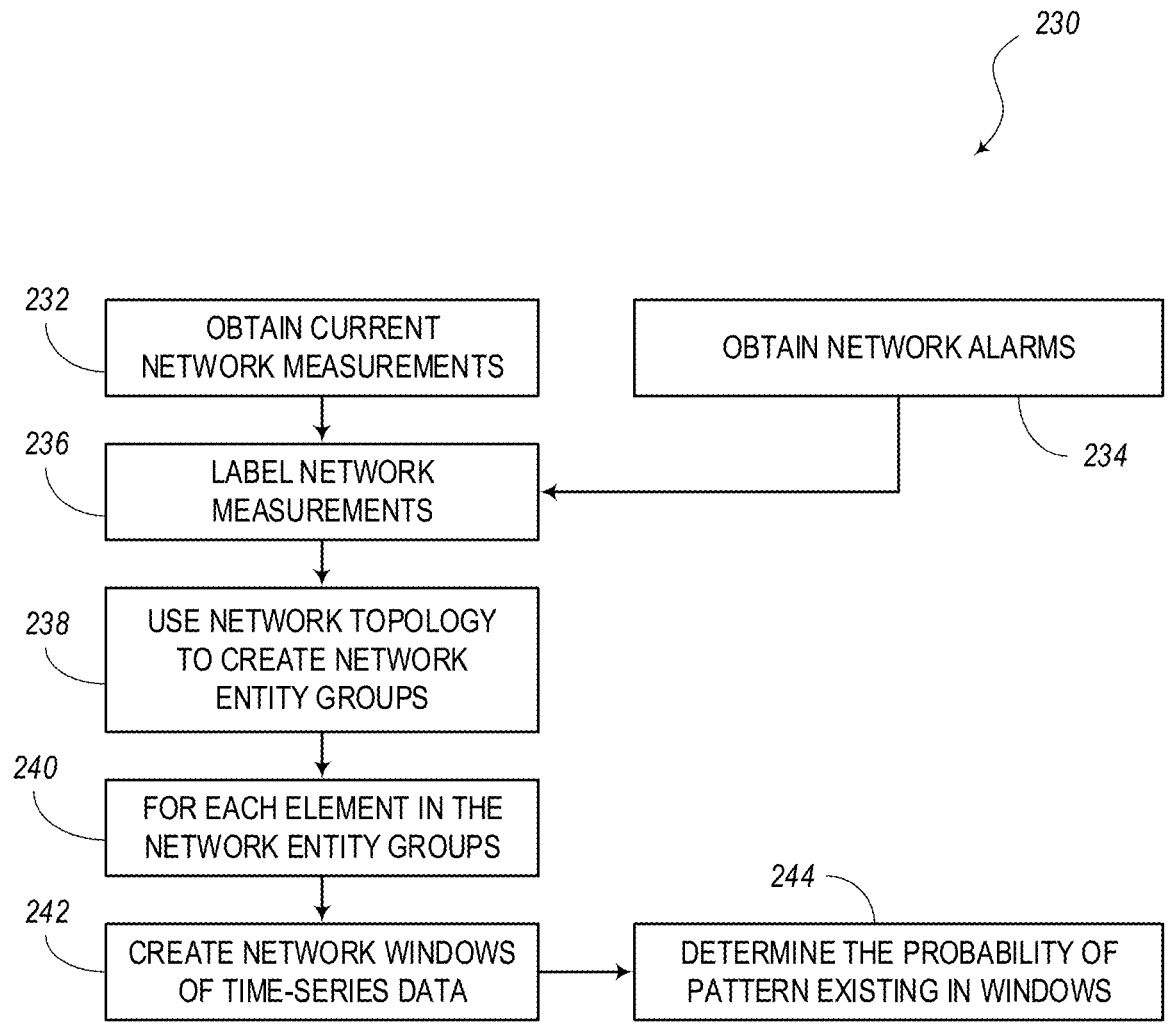
FIG. 6B is a flow diagram illustrating an inference process for utilizing ML to identify a root cause of one or more issues in a communications network from current time-series data obtained from the communications network, according to some embodiments.

FIG. 6B is a flow diagram showing an embodiment of a method 230 for inference of a trained ML model for root cause identification by using network time-series data. The method 230 includes obtaining current network measurements (as indicated in block 232) and obtaining network alarms (as indicated in block 234). Using the current network measurements and network alarms, the method 230 includes labelling network measurement, as indicated in block 236. The method 230 also includes using network topology to create network entity groups, as indicated in block 238. For each element in the network entity groups (block 240), the method 230 includes creating network windows of the time-series data (as indicated in block 242) and determining the probability of pattern existing in the windows (as indicated in block 244).

To solve the RCI problem, the embodiments of the present disclosure may combine three independent ideas: (1) graph analytics methods, which convert a network topology to a network dependency graph, (2) machine learning methods that detect patterns in network time-series which have already been evaluated, and (3) processing of input data to enable RCI from the other two methods.

The training portion of the process is summarized in FIG. 6A. Block 218 shown in FIG. 6A and block 238 shown in FIG. 6B correspond to graph analytics. Block 220 shown in FIG. 6A and block 240 shown in FIG. 6B correspond to novel processing of input data to identify root causes. Blocks 222, 224 shown in FIG. 6A and blocks 242, 244 shown in FIG. 6B correspond to machine learning.

Input data processing depends on graph analytics to provide it with information about the graph dependencies. This information is captured as "network entity groups." The creation of the network entity groups (i.e., blocks 218, 238) may be configured to follow the procedure outlined in FIGS. 1A and 1B. Network topology is analyzed using graph analytics and a dependency graph is created to indicate which network elements are to be analyzed during RCI for the top-level service. A group of network elements with the same set of collected data is called a "network entity group." There may be one network entity group for each service, each type of network element, and each type of network measurement in its dependencies.

The network processing (e.g., blocks 218, 220 shown in FIG. 6A and blocks 238, 240 shown in FIG. 6B) may be based on the same principle, with the main difference being that (1) data in FIG. 6A comes from historical measurements and is used to train a machine learning algorithm, while the data in FIG. 6B is current data used to detect pattern for RCI in real-time, and (2) data in FIG. 6A is processed for training purposes, while data in FIG. 6B is processed for inference and eventual RCI prediction. During training (i.e., FIG. 6A), data of a network entity group is overlaid and labelled with alarms from the service for the group (e.g., block 220).

Figure 7:
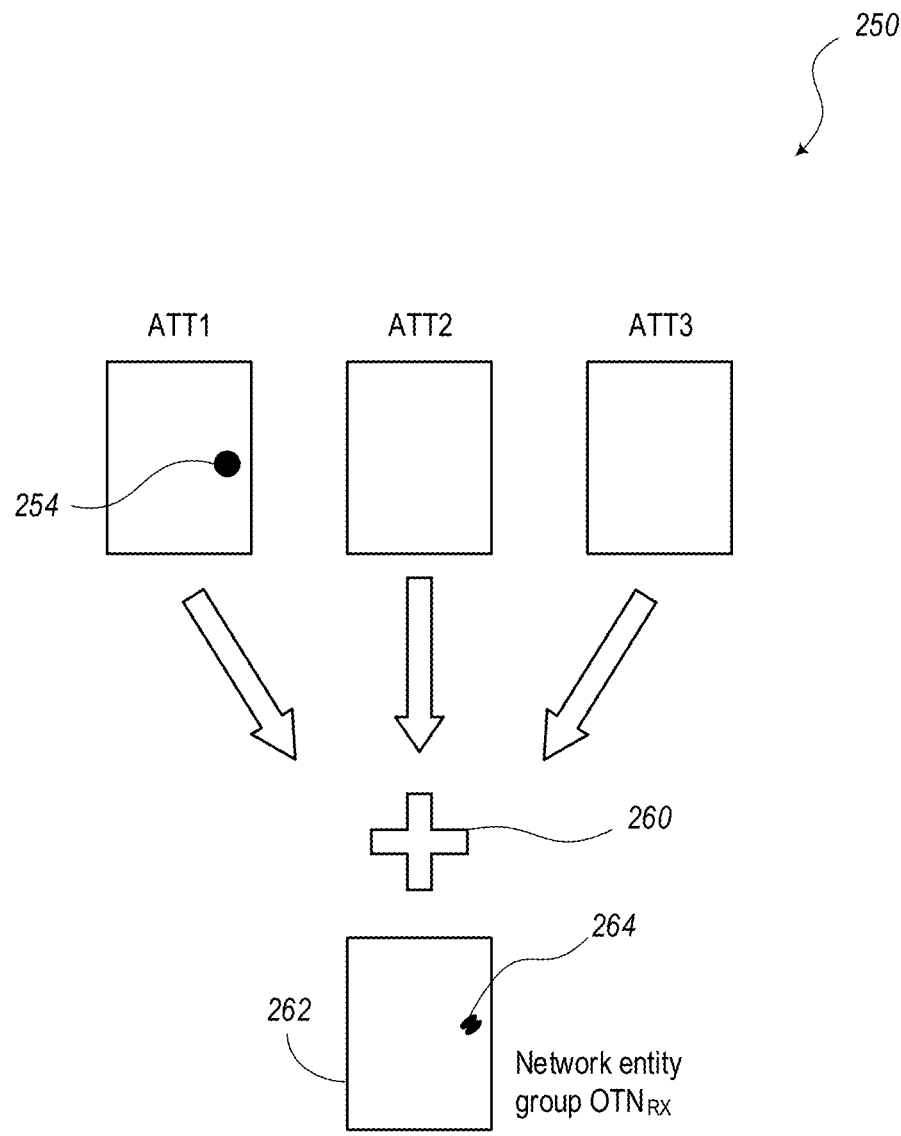
FIG. 7 is a diagram illustrating overlaid data in a same network entity group, according to some embodiments.

FIG. 7 is a diagram showing an embodiment of a process 250 for overlaying data in the same network entity group. The process 250 may be related to FIG. 1A in that ATT1, ATT2, ATT3 metrics are obtained from components (e.g., AMPs 12, 14, 16, respectively) of the network. The process 250 shows one way to overlay and combine the data by adding the same time periods together. The process 250 also shows the data in the windowing format discussed below. The ATT1 metric may include, for example, a pattern 254 that the machine learning is detecting. The ATT1, ATT2, ATT3 metrics are combined using an adding procedure 260 to achieve a combination element 262. It may be noted that the pattern 254 in ATT1 becomes "faded" in the combined data of the combination element 262, which includes faded pattern 264. The faded pattern 264 is still present and may still be detectable. In other words, a machine learning algorithm can still be trained to detect it. Data from multiple network entity groups with the same network element and network measurement type are appended together to create a training dataset. There may be one machine learning algorithm trained for each network element and network measurement type.

During the inference process of FIG. 6B, the network entity group is used to bring together data belonging to the same network element and measurement type supporting the same service. The data may look like the row of metrics (i.e., ATT1, ATT2, ATT3) shown in FIG. 7. The separate pieces of data are passed through the trained machine learning data and the probability that the pattern is present in them is recorded. The element with the highest probability is declared as the root-cause of the problem. It may be noted at this point that the pattern is not nearly as "faded" as it was during training and may be easily detected.

Windowing Procedure

A windowing procedure and pattern detection procedure are described below with respect to FIGS. 8A, 8B, and 9. The windowing procedure may correspond to block 222 (FIG. 6A) and block 242 (FIG. 6B). Also, the pattern detection procedure may correspond to block 224 (FIG. 6A) and block 244 (FIG. 6B).

Figure 8A:
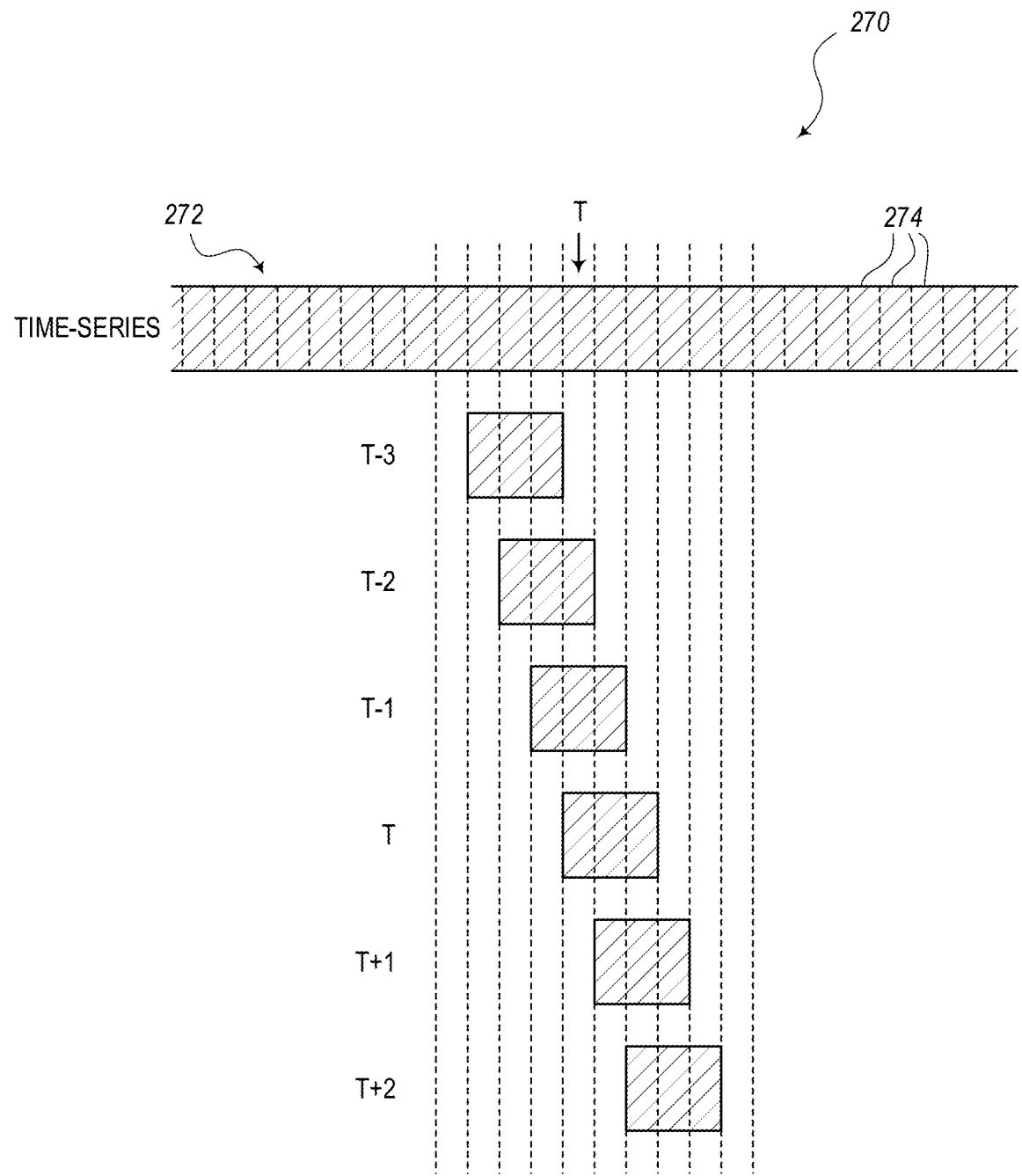
FIG. 8A is a diagram illustrating a process of retrieving portions of time-series data using a one-dimensional sliding window, according to some embodiments.

FIG. 8A is a diagram of an embodiment of a data retrieval process 270. Time-series data 272 is obtained from an environment (e.g., a communications network) in a time-series fashion. In other words, discrete variables 274 (e.g., PM metrics) are measured or obtained at discrete periodic points in time and can be stored in a sequence. The sequential time-series data 272 therefore includes the variables 274 in the order that they were measured in the environment. The data retrieval process 270 includes utilizing a one-dimensional sliding (or moving) window. In this embodiment, each of the sliding windows includes three consecutive values of the variables 274. For example, a T−2 window includes values measured at time points T−2, T−1, and T.

In the data retrieval process 270 of FIG. 8A, the windows are shown as one-dimensional (e.g., one variable 274 at each point in time). The sliding windows are stepped through/passed over the time-series data 272 resulting in a sequence of related, overlapping windows. For each window in the sequence of windows (T−3, T−2, T−1, T, T+1, T+2), a figure of merit is found (i.e., the probability that an anomaly or other significant pattern is present in that window). The sequence of figures of merit is examined for overlapping segments. In the example of FIG. 8A, the pattern may have the highest figure of merit, for instance, in windows T−1 and T. The conclusion is that the anomaly exists in the overlapping windows T and T+1.

Figure 8B:
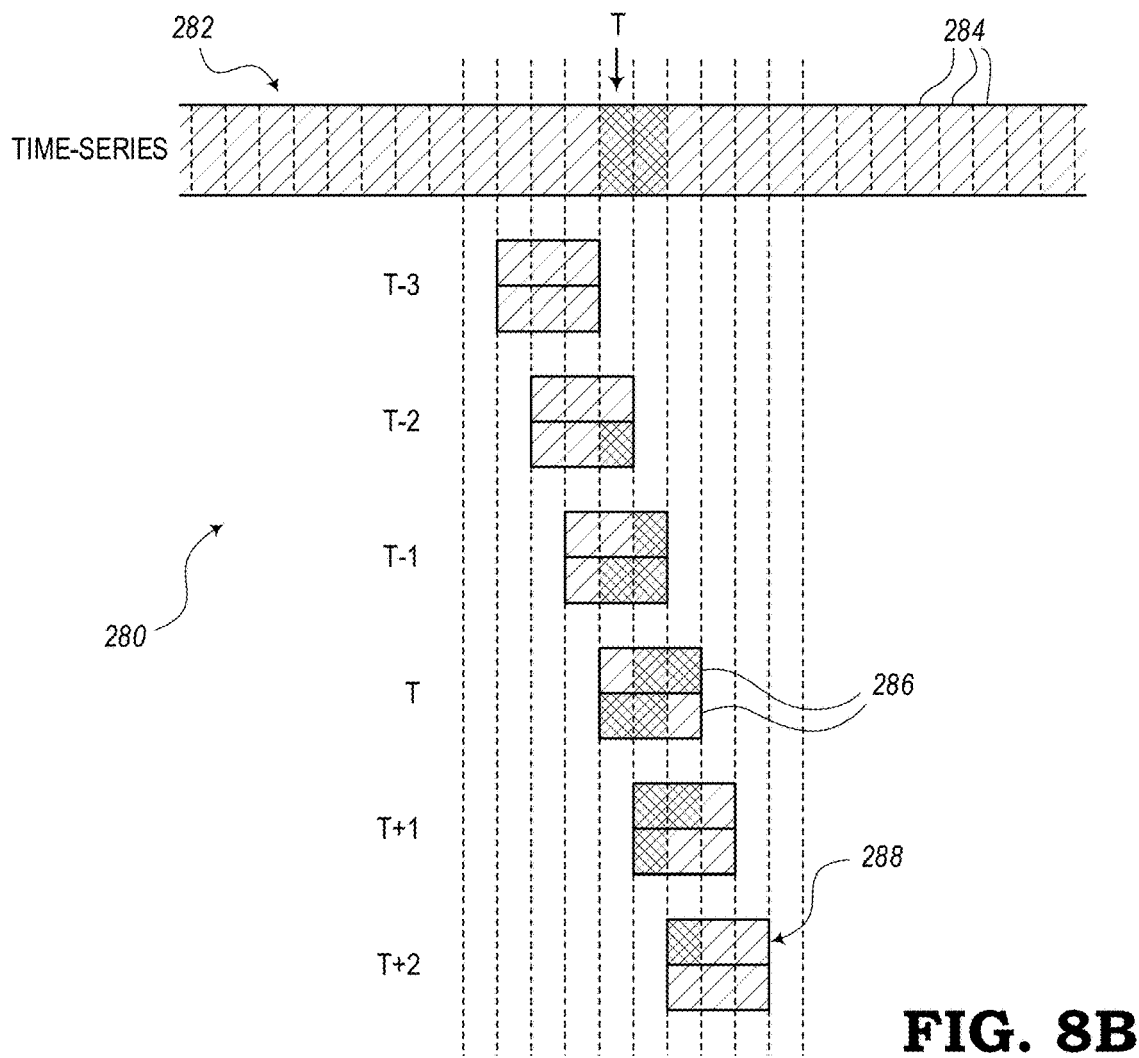
FIG. 8B is a diagram illustrating a process of retrieving portions of time-series data using a two-dimensional sliding window, according to some embodiments.

FIG. 8B is a diagram of an embodiment of a data retrieval process 280 for obtaining a two-dimensional sliding window. Time-series data 282 is obtained from an environment (e.g., a communications network) in a time-series fashion such that discrete variables 284 are measured or obtained at discrete periodic points in time and can be stored in a sequence. The sequential time-series data 282 therefore includes the variables 284 in the order that they were measured in the environment. The data retrieval process 280 includes utilizing a two-dimensional sliding (or moving) window. In this embodiment, each of the sliding windows includes three consecutive values of each of the two variables 274. For example, a T−2 window includes values measured at time points T−2, T−1, and T.

The data retrieval process 280 of FIG. 8B shows a two-dimensional (e.g., two variables) moving (sliding) window. The sliding windows are stepped through/passed over the time-series resulting in a sequence of related windows, which are stacked together to form two-dimensional matrices. FIG. 8B illustrates stacking of two rows, but multiple rows (e.g., multiple variables) can also be stacked together. For each matrix in the sequence, a figure of merit is found (e.g., probability that an anomaly or other pattern is present). A sequence of matrices is examined to detect the matrix with the highest value and the figures of merit are examined for overlapping segments. In the example of FIG. 8B, the pattern with the highest figure of merit, for instance, may be in windows T−1 and T. Thus, the conclusion is that the anomaly exists in the overlapping windows T and T+1.

For illustration, pattern detection is shown using two-dimensional windows over the time-series and deep learning networks. An aspect that enables pattern detection in network time-series is the way the data is windowed to obtain the chunks of time-series and then combined into two-dimensional windows, applicable to pattern detection.

In addition, FIG. 8B illustrates the process of obtaining two-dimensional windows from time-series data 282. The time-series data 282 is sampled with even samples that are Δ seconds apart. A time window of length m is stepped through/passed over the time-series with a lag 1, obtaining a series of horizontal vectors with length m. The horizontal vectors are grouped in groups of n (where n=2 in the example of the two-dimensional matrices) and then stacked to obtain matrices of size m×n. A matrix is obtained for every lag, resulting in a series of overlapping matrices $i_k$, which can be referred to as images and can be processed using image processing techniques.

The systems and methods use the two-dimensional windows and a deep convolutional neural network (CNN) for pattern detection. The pattern detection training procedure can be summarized as follows: (1) obtain two-dimensional windows from the time-series, (2) use a back-propagation algorithm to train a CNN with the windows. The pattern detection online procedure can be summarized as follows: (1) upon receipt of a new time-series, obtain new two-dimensional window and pass it to the trained CNN, which provides the classification at its output.

In one embodiment, image pattern recognition CNN is used. This means that the time-series is converted to an image. With respect to FIG. 8A, the time-series data 272 is shown with vertical bars representing the variables 274, where each bar may correspond to a time-series sample. If a multi-dimensional time-series is used (e.g., FIG. 8B), the vertical bar represent variables 284 may be a column vector. A sliding window is used to select a subset of time-series values, which are close together in time.

In FIG. 8B, the two-dimensional sliding windows 288 are shown for times T−3, T−2, T−1, T, T+1, T+2. A two-dimensional sliding window can be obtained from multiple one-dimensional time-series windows 286 by stacking consecutive windows on top of each other to obtain matrices, as shown in FIG. 8B as windows 288. A feature of the windowing procedure, combined with machine learning, is that it can be used to localize the pattern in time. In FIG. 8B, the windowing procedure obtains several windows T−3 to T+2. As the pattern may be mostly localized in window T in this example, the conditional probability of the anomaly or pattern presence is the highest in that window, thus localizing the pattern as starting at time T.

A procedure can be devised on top of this procedure to search for the optimum window size as well. That procedure will repeat the search for the pattern using a number of window sizes W for each of the time slots T. The window size W with the highest conditional probability at time T is the best window size for the anomaly. This procedure is used during the training of the classifier, so in fact the classifier is trained with multiple window sizes W on the training data set and the windowing procedure T is used on the testing set to select the best W by picking the combined classifier and window size.

Going beyond a simple CNN, a similar procedure can be used with a regional convolutional neural network (R-CNN), which may be one of the preferred implementations. The R-CNN conceptually takes the two-dimensional image from matrix shown in windows 288, separates out multiple non-overlapping image regions, and applies pattern detection to each region in parallel. Using this approach, it is possible to examine the time-series data 272, 282 for multiple different overlapping patterns. The training and usage procedure for R-CNN is the same as for the CNN, but instead of training and using a CNN, R-CNN is used. Since the conceptual version may be computationally expensive, other R-CNN procedures such as "faster R-CNN" and "mask R-CNN" may be used instead, but with the same general functionality. For example, the concept of "faster R-CNN" is defined in *Faster R-CNN: towards real-time object detection with region proposal networks*, by Shaoqing Ren, Kaiming He, Ross Girshick, and Jian Sun, Proceedings of the 28th International Conference on Neural Information Processing Systems—Volume 1 (NIPS'15), 2015, C. Cortes, D. D. Lee, M. Sugiyama, and R. Garnett (Eds.), Vol. 1, MIT Press, Cambridge, Mass., USA, 91-99. Also, the concept of "mask R-CNN" is defined in *Mask R-CNN*, by K. He, G. Gkioxari, P. Dollar and R. Girshick, IEEE International Conference on Computer Vision (ICCV), Venice, 2017, pp. 2980-2988, doi: 10.1109/ICCV.2017.322.

Generally speaking, mask R-CNN has the highest pattern detection capabilities. It uses the structure of the underlying CNN to find a precise border around the pattern in the image. This contrasts with the CNN or other R-CNN procedures, which use a square bounding box, which may introduce noise. Other advantages of using a mask R-CNN is that it can examine larger two-dimensional windows and find multiple types of patterns. The larger window may result in better precision. While finding multiple patterns is possible with a CNN, this might usually be done in series. One advantage of the R-CNN is that it can find multiple patterns in parallel.

The approach in creating two-dimensional windows can be used to create multi-dimensional matrices (e.g., tensors) as well. A tensor is obtained when two-dimensional windows are stacked on top of each other. This can be used to discover patterns that exist across multiple time-series. For example, suppose that it is determined that congestion occurs if two or more related or dependent actions occur at the same time, such as if a first group of specific buffers are over 80% utilization and another specific buffer is over 40% utilization. An approach that examines buffer time-series independently would not discover this correlation resulting in congestion.

A two-dimensional window is created by stacking together one-dimensional windows as shown in FIG. 8B. The key discovery that enables pattern detection in network time-series is the way the data can be "windowed" to obtain the chunks of time-series and then combine this into two-dimensional windows, applicable to pattern detection.

The time-series is shown with vertical bars, where each bar may correspond to a time-series sample. If a multidimensional time-series is used, the vertical bar may be a column vector. A sliding window is used to select a subset of time-series values, which are close together in time. In FIG. 8B, two-dimensional sliding windows are shown for times T−3, T−2, T−1, T, T+1, and T+2. A two-dimensional sliding window can be obtained from one-dimensional time-series windows by stacking consecutive windows on top of each other as shown in the figure. The more heavily shaded areas in the time-series represent where an observation is in the two-dimensional window.

A feature of the windowing combined with the machine learning is that it can be used to localize the pattern in time. The windowing procedure obtains several windows T−3 to T+2. As the pattern is mostly localized in window T, the conditional probability of the pattern presence will be the highest in that window, thus localizing the pattern as starting at time T.

Pattern Detection with Supervised Learning

Pattern detection in network time-series is a technique that works by creating windows from the time-series of interest and then detecting a pattern in the time-series by using Deep Neural Network (DNN) object detection techniques. In a supervised learning setting where labels are available and each time is marked as containing the pattern, some methods may use the two-dimensional windows and a deep Convolutional Neural Network (CNN) for pattern detection. This is similar to using a CNN to detect cat images in YouTube videos, for example, which was made famous by Google. Other methods can be used as well, such as mask R-CNN, which is a special type of a CNN.

The pattern detection training procedure can be summarized as follows: (1) obtain two-dimensional windows from the time-series, (2) use the back-propagation algorithm to train a CNN with the windows. The pattern detection online procedure can be summarized as follows: (1) upon receipt of a new time-series, obtain new two-dimensional window and pass it to the trained CNN, which provides the classification at its output. According to various embodiments of the present disclosure, some methods may be configured to use image pattern recognition CNN, which means in this case that the time-series is represented as an image.

Figure 9:
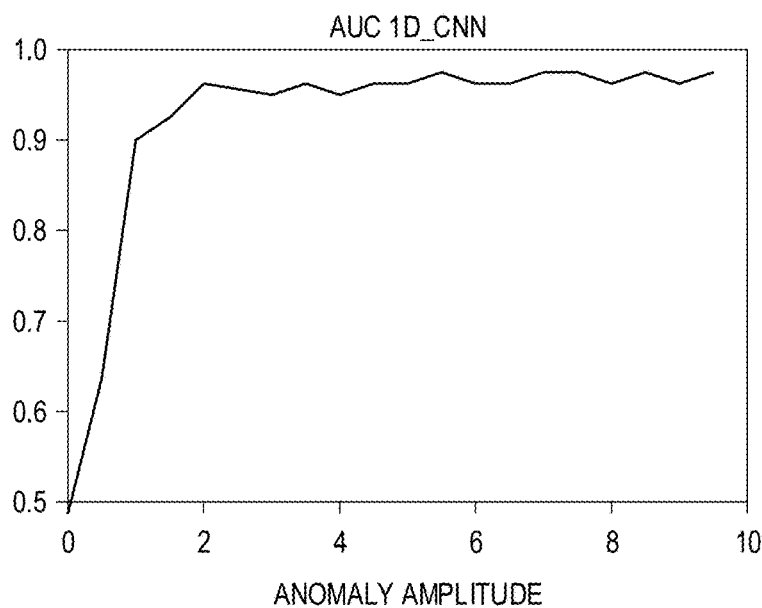
FIG. 9 is a graph illustrating a process for creating a two-dimensional window from time-series data, according to some embodiments.

FIG. 9 is a graph 290 showing anomaly amplitude for pattern detection in a ML method. Two machine learning methods have been evaluated. A result relevant to the present disclosure is shown in FIG. 9. The graph 290 shows an Area Under the Curve (AUC) of the detection of a pattern in time-series. The data was generated by keeping the background of the time-series constant on average (i.e., the background includes random noise), while the amplitude of the detected pattern increases.

The graph 290 is related to the creation of a two-dimensional window (e.g., image) from time-series. It may be noted that a pattern is detected with about the same AUC through a wide range of amplitudes. Similarly, it may be expected that a similar AUC performance would result if the amplitude of the anomaly were to be kept the same while the noise was increased. The relevant measure is the Signal-to-Noise Ratio (SNR), which can be changed through its nominator or denominator. The pattern detection method is very resilient to the increase of the background noise.

Location of Root Issues in Packet-Optical Networks

FIGS. 10A-10H show a section of a communications network 300, such as packet-optical networks labelled 300A-300H. The communications network 300 may correspond to the sections of communications networks 50, 80 of FIGS. 3A, 3B, respectively. The root cause identifying module 144 shown in FIG. 4 may be configured to perform a process for finding the location of the root issues in a network (e.g., packet-optical network). The process may utilize information of at least a partial topology of the communications network 300. The communications network 300 as shown in FIGS. 10A-10H includes a WSS device 302, AMPs 304, 306, 308, 310, and WSS device 312 on Layer 0, OTM devices 314, 316, 318, 320 on Layer 1, and ETH device 322, 324 on Layer 2. AMP and Raman PMs may be optional alarms. The AMPs 304, 306, 308, 310 of an OTU hop may be aggregated. Binary classified AMPs may be aggregated by their Layer 1 impact. If problematic, a further classifier among all AMPs 304, 306, 308, 310 may be used to identify the problematic element.

Figure 10A:
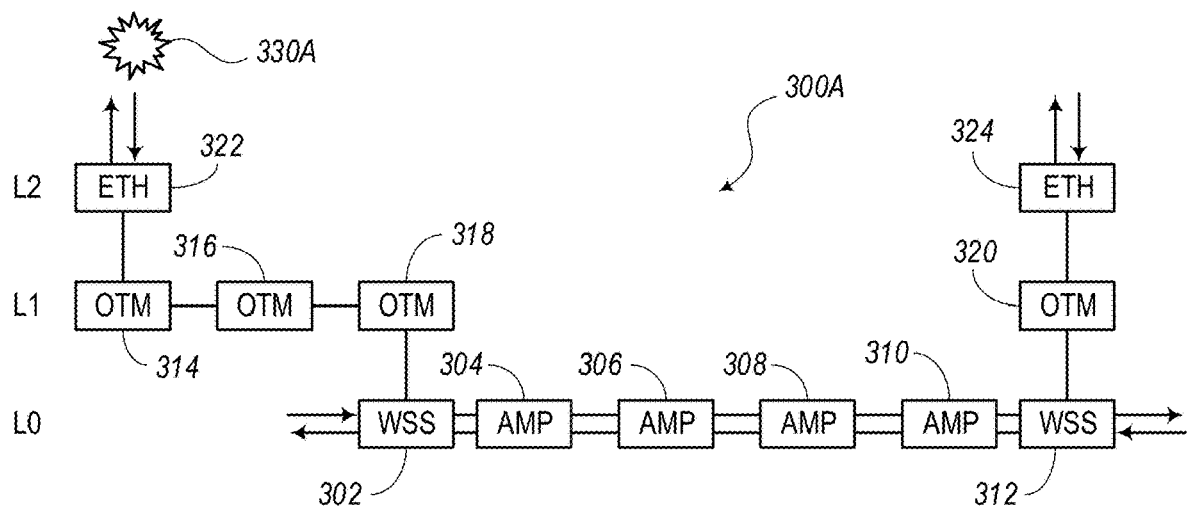
FIGS. 10A-10H is a block diagram illustrating a fifth section of a communications network having multiple layers and a process for locating and identifying a root cause of an issue in the communications network, according to some embodiments.
Figure 10B:
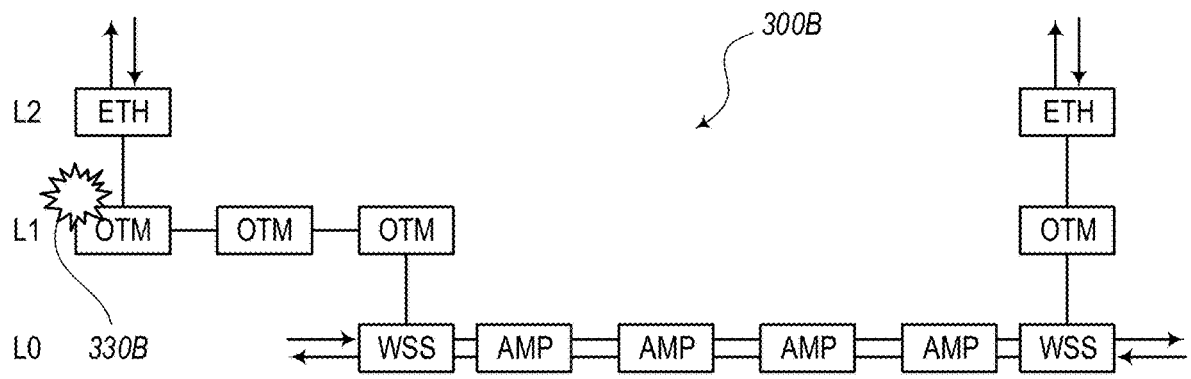

FIG. 10A shows the network 300A in a condition where a client-side issue 330A is detected. The ETH device 322 on the client side detects an Ethernet—Un-Available Seconds (E-UAS) parameter and sends a "far-end" alarm. FIG. 10B shows a card issue on the OTM device 314. The ETH device 322 provides the E-UAS measure along with an Optical-channel Data Unit Un-Available Seconds (ODU-UAS) measure and an Optical-channel Transport Unit High Correction Count Seconds (OUT-HCCS) measure. A local alarm from the ETH device 322 on the client side is received as a far-end alarm on the ETH device 324 on a server side.

Figure 10C:
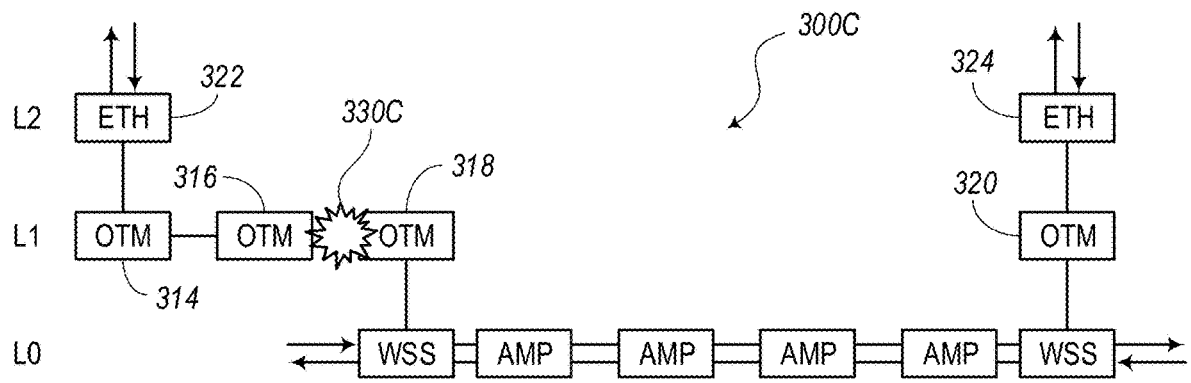
Figure 10D:
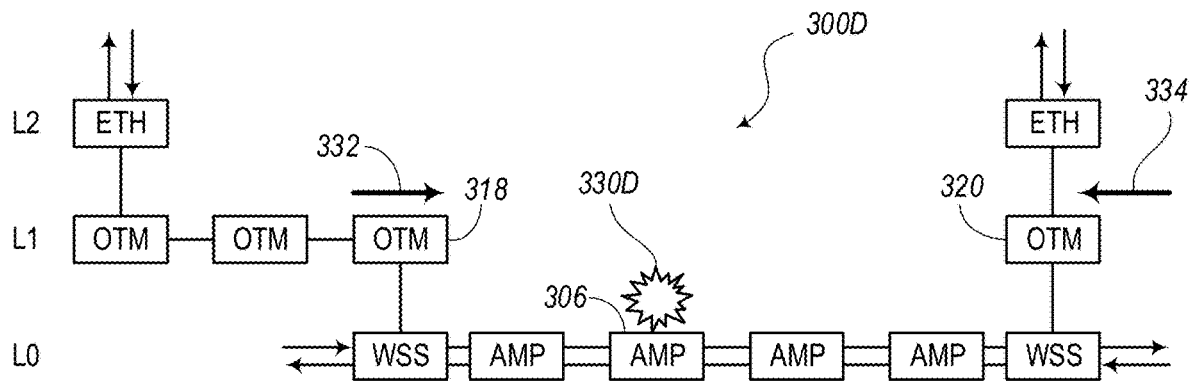

In FIG. 10C, an issue 330C is detected between OTM devices 316, 318 on Layer 1. OTM devices 316, 318 provide ODU-UAS measures and OUT HCCS measures, while ETH devices 322, 324 provide E-UAS measures and OTM devices 314, 320 provide ODU-UAS measures. FIG. 10D shows the network 300D where an issue 330D is detected at the AMP 306, where a "local" alarm is sent. An Alarm Indication Signal (AIS) 332 may be sent in a forward direction, while a Backward Defect Indication (BDI) alarm 334 may be sent in the reverse direction.

The direction (i.e., transmit or receive) of PMs may be self-explanatory. For example:

INFrames: receive
OUTFrames: transmit
Optical Power Received (OPR)/Optical Power Input (OPIN): receive
Optical Power Transmitted (OPT)/Optical Power Output (OPOUT): transmit
SPANLOSS: receive
Quantum Bit Error Rate (Q/BER): receive Errors are usually in the "receive" direction (i.e., ES, HCCS, etc.).

Figure 10E:
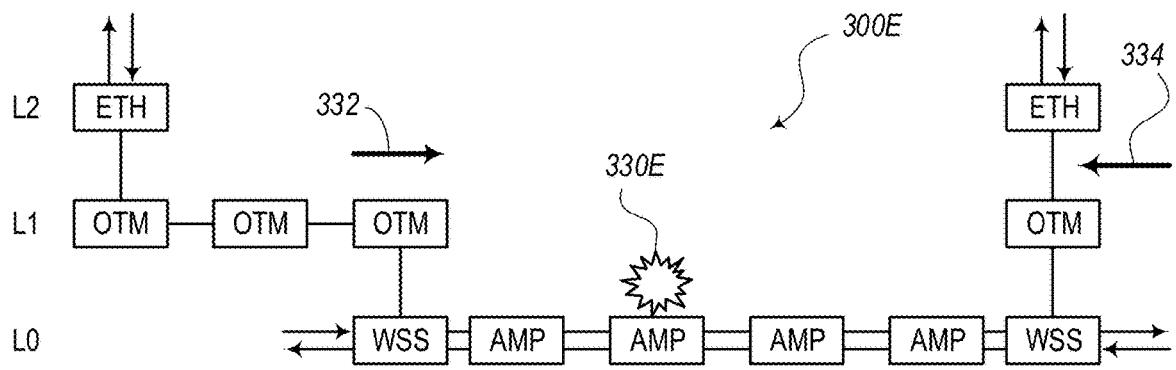
Figure 10F:
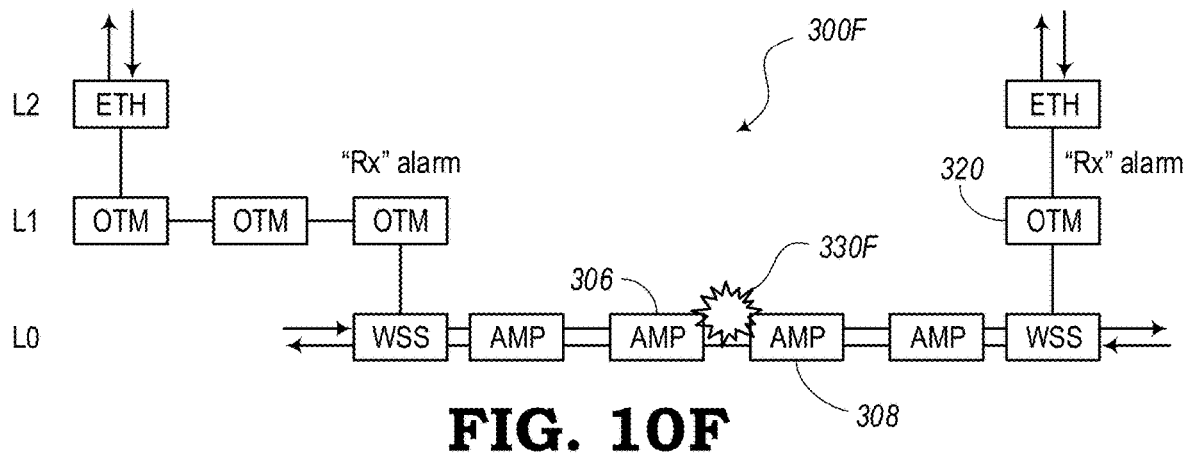

In FIG. 10E, the network 300E is shown. The AIS alarm 332 is sent as a forward alarm and the BDI alarm 334 is sent as a backward alarm. There can be a case where a L0 problem is growing (e.g., span loss slowly increasing) without any L0 alarm yet. The impact on the overlay layer (L1) can be still observed if it exists. FIG. 10F shows the network 300F with an issue 330F between AMPs 306, 308. In this case, there may be a fiber issue, such as a condition where a payload cannot travel to the next OTM 320. The OTM device 320 may send a "receive" alarm, which the OTM device 318 may receive and interpret as a Loss of Signal, Loss of Channel, and/or Loss of Frame. This is seen as a bi-directional issue. Both Rx alarms are sent, but no BIS/AIS alarms are sent.

Figure 10G:
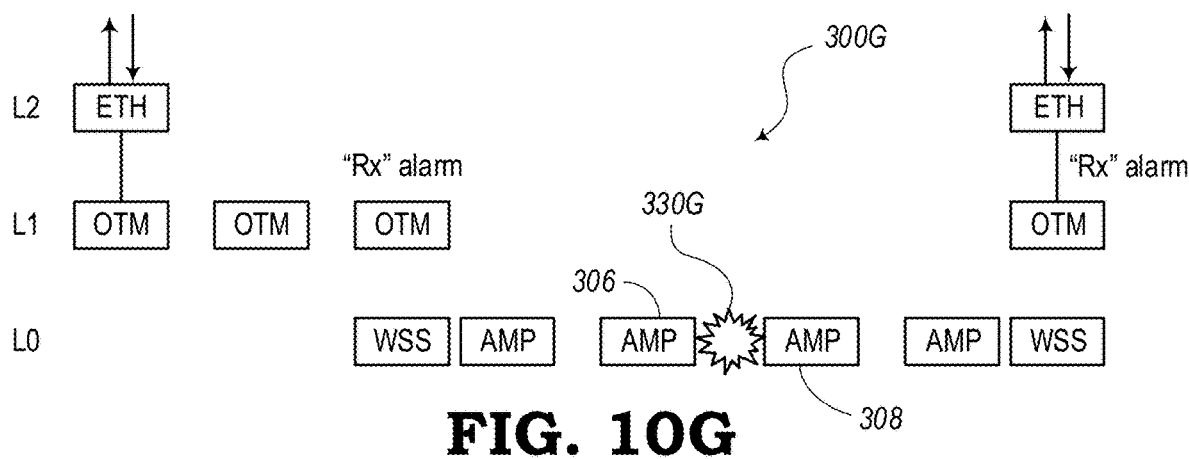

FIG. 10G shows the network 300G without the topology. In other words, the links between components are not shown. The issue 330G is shown near (between) AMPs 306, 308, which provide "fiber" alarms. The fiber issue is that the payload cannot travel to the next OTM. Again, this is a bi-directional issue, with both Rx alarms and no BIS/AIS. Without the topology, the L0 Alarms are very likely to have an impact on service. To diagnose, the most obvious place to start is to look for: 1) an Optical Line Fail, 2) a Shutoff Threshold Crossed, which depends on OPIN of an AMP going below use-provisioned threshold, 3) an Automatic Power Reduction Active, or others, which may include Automatic Shutoff, Channel Degrade, Circuit Pack Failed, DOC Action Failed: Optimize, DOC Action: Fault Detected, DOC Domain Not Optimized, Gauge Threshold Crossing Alert Summary, High Fiber Loss, High Received Span Loss, Minimum Gain, etc.

Figure 10H:
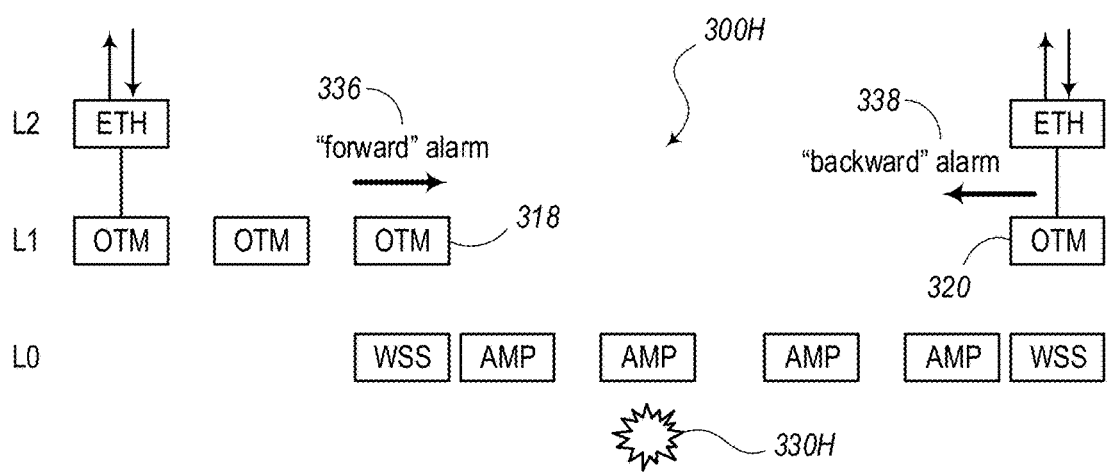

FIG. 10H shows the network 300H with an issue 330H near AMP 306. A forward alarm 336 is provided by the OTM device 318 and a backward alarm is provided by the OTM device 320. According to various use cases, a Layer 0 "local" alarm may be sent. A label may be provided for a service-impacting alarm (e.g., Shutoff Threshold Crossed, Automatic Power Reduction Active, etc.). Features may include AMP or Raman PMs. The arrangement may be similar to known UAS or HCCS today, but, according to the present embodiments, may use the above-mentioned labels instead. Without topology, this becomes a purely local issue. Any AMP issues usually affect only one direction.

Figure 11:
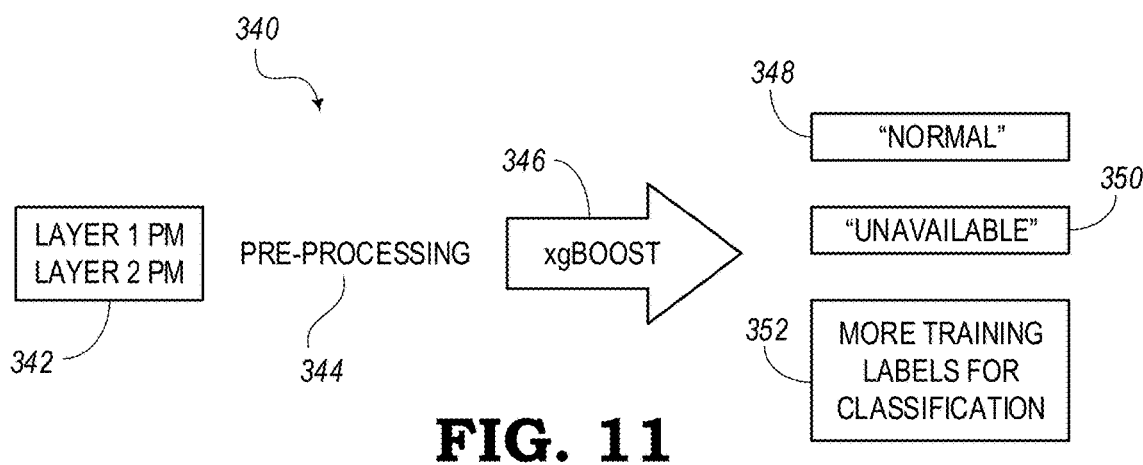
FIG. 11 is a diagram illustrating a process for predicting issues in a communications network, according to some embodiments.

FIG. 11 is a flow diagram showing a process 340 for raising the operational value of systems and methods for predicting the health of a network. Layer 1 and Layer 2 PMs are received 342, and, in some embodiments, Layer 0 PMs are also received. Other inputs may include alarms. Other "value" metrics can also be obtained from the network, such as a precision vs true positives (or recall). Other metrics can be obtained and processed for analyzing the health of the network, such a value of the true positives for defining an impact on the services, a cost of false positives, thresholds that may be tunable by customers, etc.

The process 340 includes performing pre-processing of the data 344. Any suitable algorithm or technique may be used for processing the data, such as xgBoost 346. As an example, other algorithms (e.g., DNN, weighted loss function, etc.) may be useful in the process 340. The algorithm (e.g., xgBoost) 346 may output "normal" 348 or "unavailable" 350. The algorithm 346 can also output more training labels for classification 352. In some embodiments, the process 340 may also include post-inference rules. The process 340 may be configured to predict health longer in advance as compared with other algorithms. Also, the process 340 may be configured to provide better root-cause identification and a better explanation of remediation actions for improving the health of the network.

FIG. 12 is a diagram of a chart 360 of Un-Available Seconds (UAS) of an exemplary Ethernet port over time. The chart 360 shows a number of issues/anomalies on each day. The issues may include E-UAS of the Ethernet port. Some versions of network health processes may have lacked information about network topology, but, according to the embodiments of the present disclosure, the systems described herein are configured to analyze atomic network elements (e.g. ports, channels, or facilities) individually. This has led to success in identifying abnormal facilities and classifying their issues, and even predicting issues ahead of time.

The software applications (e.g., the root cause identification module 144 or other programs) will become "topology-aware." Hence, it will be possible to know how the facilities are inter-connected in order to analyze the full multi-layer network. This brings valuable information that can improve precision and accuracy of root-cause diagnostics. However, this may imply that previous techniques used to classify individual facilities may no longer be useful. Indeed, if an input switches from an atomic facility to a stitched network, the task is no longer to classify the state of the entire network, but rather to identify and classify relevant elements (or services) within the network.

Likewise, the techniques developed to classify the state of a facility at a given time (or within a relatively short time window) become increasingly ambiguous and inefficient when considering long time-series in which the facility can go through several states. This may be a problem in programs for analyzing the health of a network, as depicted in FIG. 12. However, to address this, the present disclosure is configured to use "object recognition" techniques originally developed for computer vision, but now applied to solutions for analyzing network health (e.g., root cause identification module 144) in "stitched" (multi-layer) communications networks. This technique is similar to the single-dimensional time-series techniques of a single network element described above with respect to FIGS. 1-11. In the object recognition embodiments described below, the present disclosure proposes additional embodiments that use techniques for multi-dimensional time-series and for multiple network elements related through the network topology. Boxes 362 and 364 are illustrated in the chart 360 of FIG. 12 showing anomalies (e.g., network unavailability times) in the network.

Figure 13:
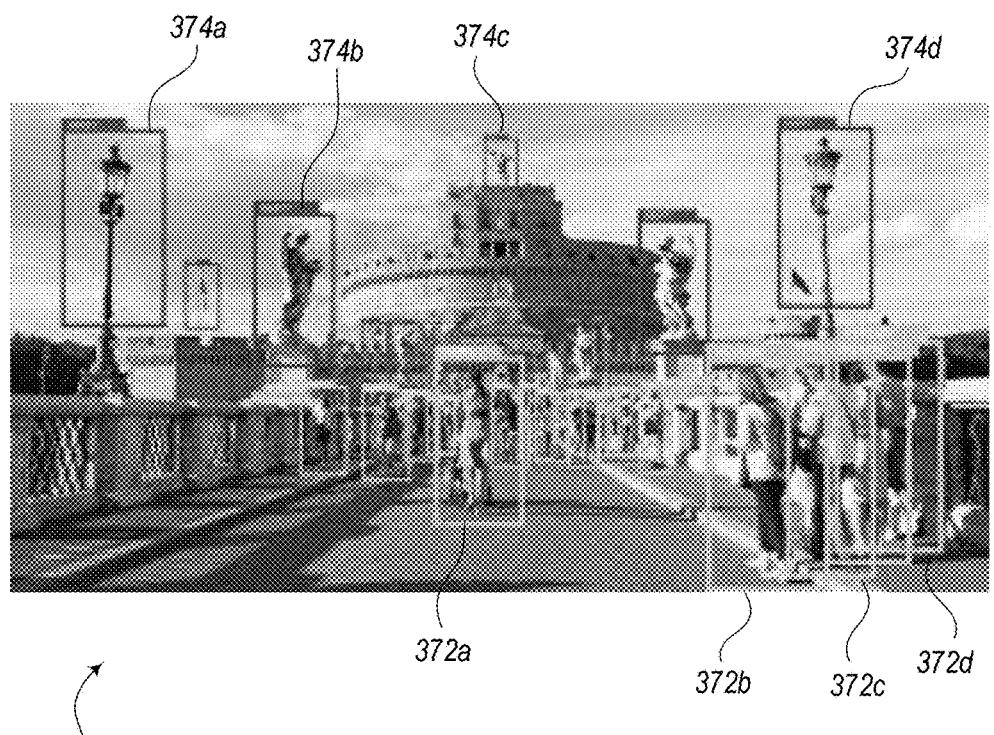
FIG. 13 is a diagram showing an example of a static image where an object recognition process uses computer vision to identify objects within the static image, according to some embodiments.
Figure 14:
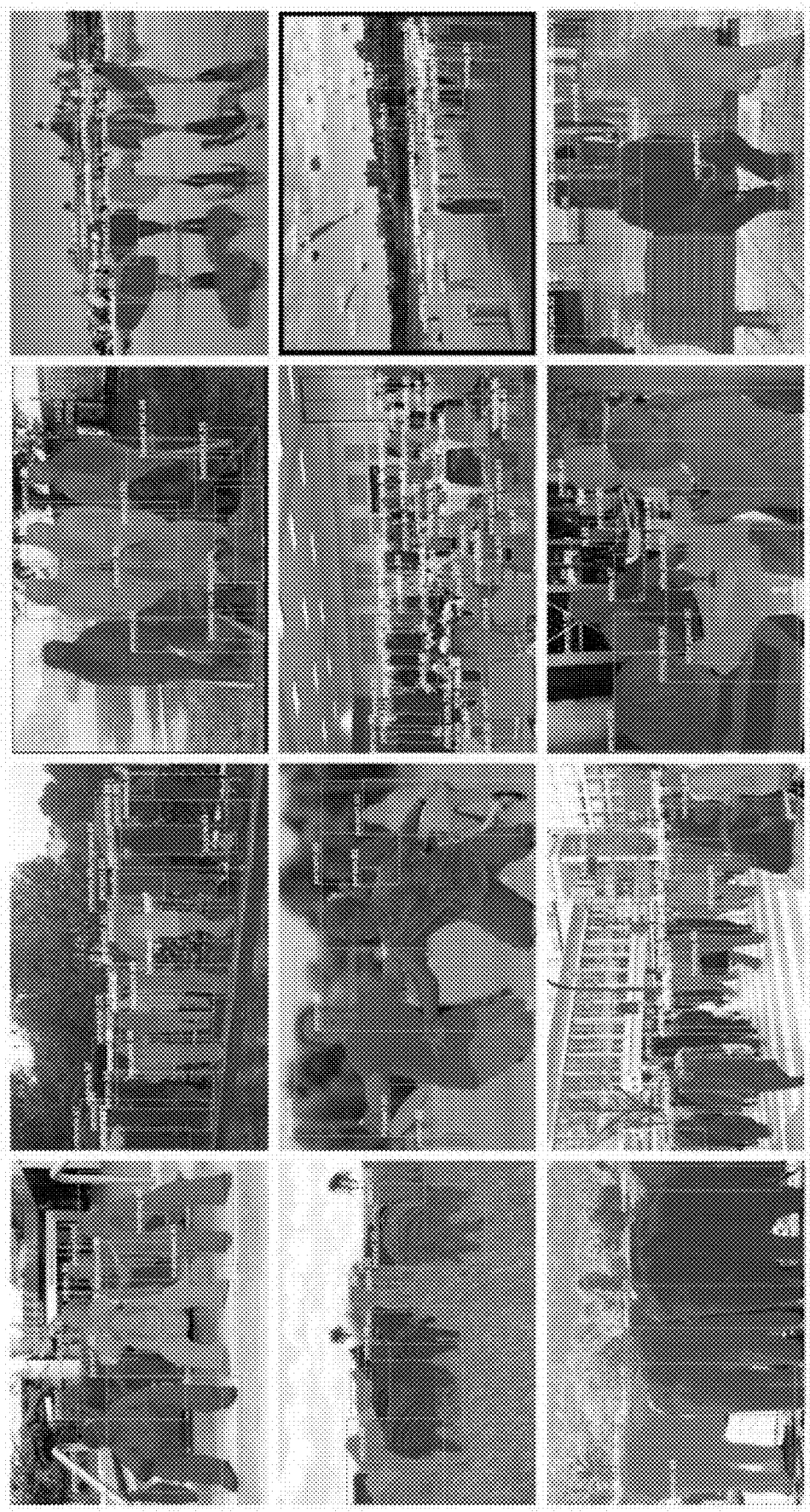
FIG. 14 is a diagram showing an example of an object recognition process within a broader image using a Mask Region-based Convolution Neural Network (Mask R-CNN) algorithm, according to some embodiments.

FIG. 13 is a diagram showing an example of a static image 370 for which object recognition may be applied in computer vision. FIG. 14 is a diagram showing an example of multiple static images 380 for which object recognition may be applied using a Mask R-CNN algorithm. The state of the art in object recognition has progressed rapidly in recent years, as described in "*Modern History of Object Recognition Infographic*," (Nikasa, https://nikasa1889.github.io/ https://medium.com/@nikasa1889/). This technology may also be generally applicable to other domains, such as communications networks, as described in the present disclosure.

As shown in FIG. 13, boxes 372*a*, 372*b*, 372*c*, 372*d* (among others) may be applied by the object recognition processes to represent individuals visible in the static image 370. Also, boxes 374*a*, 374*b*, 374*c*, 374*d* (among others) may be applied by the object recognition processes to represent inanimate objects visible in the static image 370. The systems of the present disclosure are configured to incorporate the object recognition processes within a communications network environment. For example, the boxes 362, 364 shown in FIG. 12 representing a section (e.g., of communications networks 10, 30, 50, 80, 300, etc.) may be considered as being analogous to the boxes shown on FIG. 13, representing "anomalies" in the static image 370 of FIG. 13. For example, the static image 370, in the realm of object recognition, may have first boxes 372 representing a first set of anomalies and second boxes 374 representing a second set of anomalies. The boxes 362, 364 shown in FIG. 12 may be anomalous colored sections of the network section and may be analogous to the boxes 372 of the colored regions of FIG. 13 and/or the regions shown in FIG. 14.

In some embodiments, the ML algorithms may utilize a process that is similar to object recognition algorithms for processing two-dimensional image data to determine the identity of objects within the image. For example, object recognition processes may be configured to distinguish the image of a cat from the image of a dog using certain patterns within the image. The object recognition techniques of the present disclosure can be used to determine if there are abnormalities (i.e., problems, issues, subpar performance, etc.) in the network and/or abnormalities in individual elements in the network. Using such techniques, it can be determined if the elements "look" normal. While the entire network can be classified, each individual element (e.g., NE) of the network can also be classified. As described herein, "normal" is indicative of typical operating behavior with no anticipated alarms, degradation in service or quality, etc.

The object recognition processes of the present disclosure may include justifying a whole snapshot, which can be done over time. In this way, the process may include one classification for the whole object or network. There may be multiple objects and not just one classification. In the images 370, 380, there may be multiple people. Therefore, there is one snapshot, but multiple objects, where each object can be classified. In the past, every box of FIGS. 12-14 would be used to designate a snapshot for machine learning and could be classified. In the embodiments of the present disclosure, the boxes are analyzed by the stitched network to leverage the images to a known index to connect multiple images together.

When there is an issue in the analyzed network, at least one box (possibly several boxes) will be affected by the issues. In FIG. 13, the boxes 372 of the first set are all affected by the same root cause. Thus, there is one image (i.e., the entire static image 370) and several boxes 374 corresponding to multiple other objects in the image. Similarly, with respect to a network, the whole network or facility (or a section 600 of a network or facility) may represent the entire image (e.g., image 370). The section (e.g., section of communications networks 50, 80, 300, etc.) of the network may include various elements, such as Wavelength Selective Switching (WSS) devices (e.g., WSS devices 52, 62, 82, 96, 302, 312), Channel Multiplexer/Demultiplexer (CMD) devices (e.g., CMD devices 100), Optical Channel Laser Detectors (OCLDs) (e.g., OCLD devices 90, 92, 102, 104, 106), Optical Channel Interface (OCI) devices (e.g., OCI devices 108, 110, 112), Ethernet devices such as 10-Gigabit/sec Ethernet (ETH10G) devices (e.g., ETH devices 76, 78, 114, 116, 118, 322, 324), amplifiers (AMPs) (e.g., AMPs 12, 14, 16, 54, 56, 58, 60, 84, 86, 88, 94, 98, 304, 306, 308, 310), among other elements. The issues represented by boxes 362, 364 shown in FIG. 12 may correspond to anomalies in the respective section of the network, which may be affected by the same root cause.

The object recognition may include a stitched network as an input, not just individual boxes (e.g., boxes 372, 374). A stitched network includes multiple devices (e.g., see FIG. 3B) operating at multiple layers (e.g., optical, packet, etc.). The output includes the multiple objects within that network. The process can also be generalized over time, where one time is depicted in FIG. 3B with two issues 120, 122. This can also be seen as a snapshot or picture and may include multiple snapshots over time. As an example, there may be an issue at a given object at a given place and at a given time. Instead of a one-dimensional time-series, however, the object recognition may utilize multi-dimensional time-series data, as shown in the progression of FIGS. 10A-10H.

The systems can look at time-series data coming in from one entity in the network. This can be converted to an image, such that object detection can be used on the image to find anomalies in the time-series. In addition, as described herein, the systems may operate on multiple sources of time periods coming in from the network. The present systems and methods are capable of detecting multiple issues happening simultaneously from multiple elements in the network at the same time. There may be multiple sets of time periods and these can be combined into an analysis system when objects are detected for each of these objects.

One solution may include taking two time-series sets of data from the network and convert this data to images or other two-dimensional representation. Then, the system can place these images on top of one another. At this point, a third resulting image may have two objects coming from the two time-series sets. Another solution is to perform object detection on each image separately and then combine the results of the two object detection results from each image coming in from the network.

With respect to FIG. 14 showing an example of object recognition using a Mask R-CNN algorithm or other suitable ML technique, each image shows people in different settings. In the environment of a network, however, a "snapshot" of a facility or an element of the network can be captured. As with a picture in which objects are recognized using pattern recognition techniques, an analogy can be made for classifying elements within the network being monitored, as described herein. Therefore, there is an analogy between the snapshot of a network (e.g., sections of communications networks 10, 30, 50, 80, 300, etc.) and the analysis of the pictures of the image snapshots used in object recognition. That is, a snapshot of data taken from the network is treated as an image, such as illustrated in FIG. 12 compared to the traditional photo of FIG. 13, and various object recognition techniques may be used to detect objects in the image. That is, similar techniques used to detect the objects (e.g., people, light posts, etc.) in FIG. 13 can be used to detect objects in FIG. 12 that correspond to network events.

To combine the relevant facilities together (e.g., ETH, OTM, AMP, etc.), the embodiments of the present disclosure include systems and methods that leverage the known topology of the network to build facilities inter-connection in the input data structure. This technique may be more efficient for ML training compared to a brute force approach where all facilities would be given with no structure and where the topology would need to be learned by the algorithm. The embodiments of the technique disclosed herein may be performed in two parts. The first part may use topology-aware machine learning for root-cause analysis and enhanced detection of patterns causing various network events. The second part may use machine learning to help explain the results of root-cause analysis to the network operator.

ML Training and Testing

Equipped with data structures as described above, the systems and methods (e.g., control devices 26, 46, server 130, etc.) can proceed with training that is similar to an "object recognition" classifier to identify the atomic NEs that create root-cause issues of composite structures. At this point, ML training and testing can be done as usual using Mask R-CNN, Graph NN, and/or other algorithms using the labeled data structures defined above.

Method 2: Multiple Topology-Aware ML Models

The systems and methods of the present disclosure may also be configured to use multiple ML models (one per NE) combined hierarchically, with an alarms-correlations type of approach.

Figure 15:
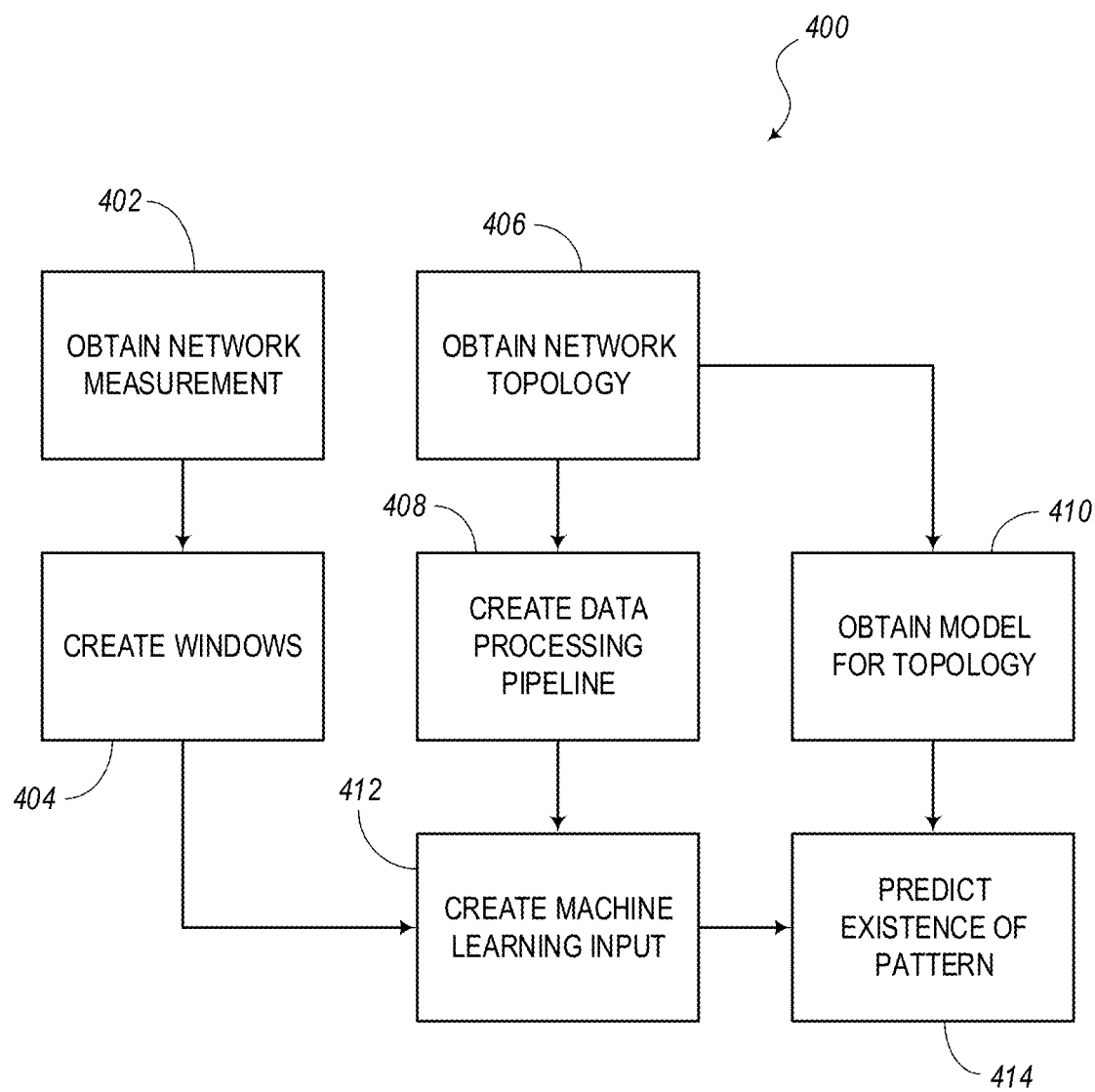
FIG. 15 is a block diagram showing a first training method for training a topology-aware ML algorithm, according to some embodiments.

FIG. 15 is a block diagram showing a training method 400 for training a topology-aware machine learning algorithm or machine learning model. In some embodiments, the method 400 may include three key points:

(1) The network topology information is used to create a hierarchical (graph-based) machine learning architecture. The attached slides show how architecture can be created to design architectures for root-cause analysis and enhanced detection of patterns across multiple network sources.

(2) The network topology information is used to create a data processing pipeline that takes into consideration the network topology. Streams of correlated data that are going to be analyzed jointly need to be combined into a single stream of data.

(3) Windowing is used on the data so that time-series are converted to two dimensional windows, which can be used with methods such as mask R-CNN.

The method 400 includes obtaining network measurements (as indicated in block 402) and creating windows (as indicated in block 404). The method 400 also includes obtaining the topology of the network (block 406), creating a data processing pipeline (block 408), and creating a machine learning input (block 412). Also, the method 400 includes obtaining a model for the topology (block 410) from block 406 and predicting the existence of a pattern (block 414) from the machine learning input of block 412 and the topology model from block 410.

Figure 16:
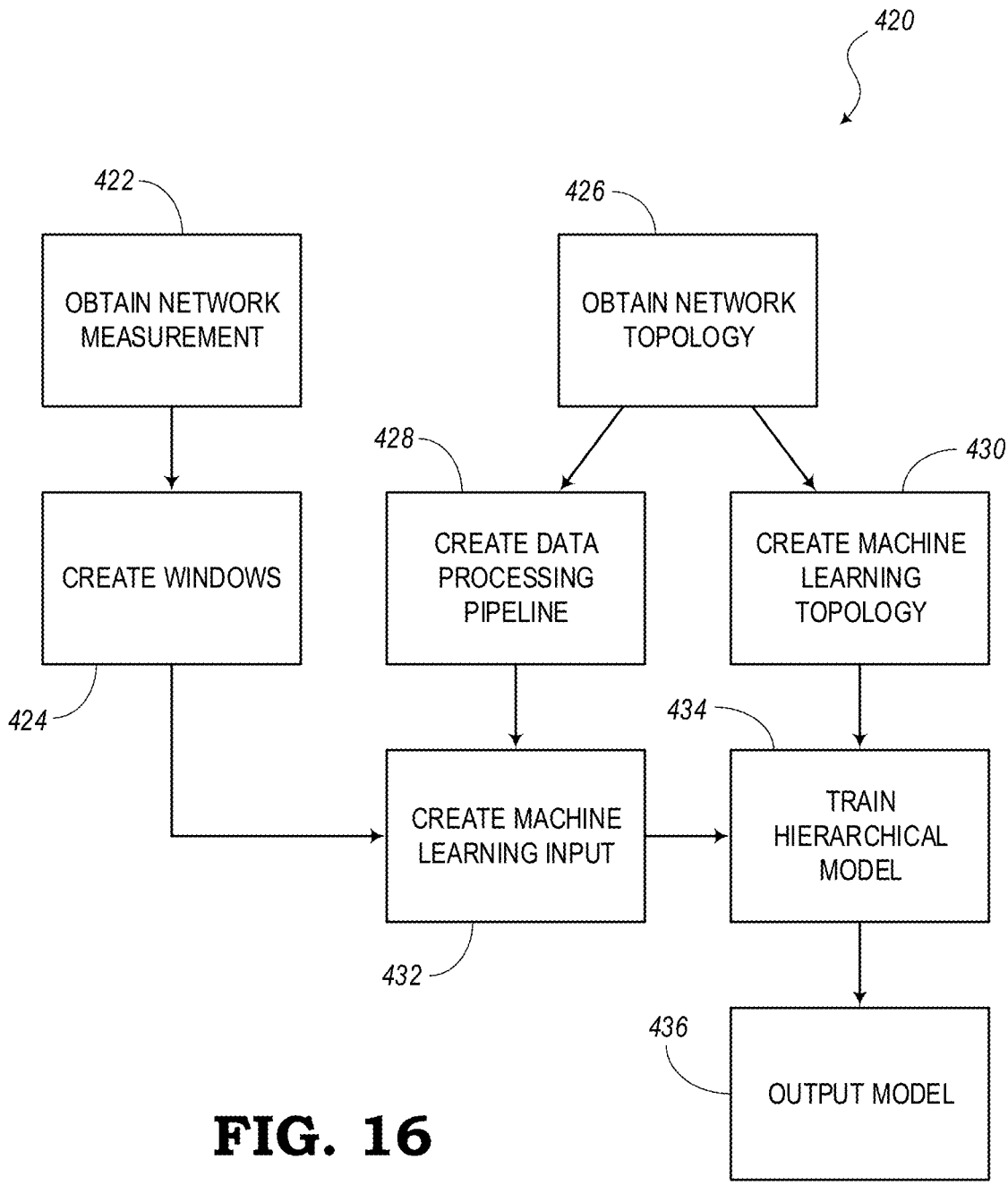
FIG. 16 is a block diagram showing a second training method for training a topology-aware ML algorithm, according to some embodiments.

FIG. 16 is a diagram showing a method 420 for training machine learning algorithms when network topology is known. The method 420 may be related to the method 400 described with respect to FIG. 15 for pattern detection when network topology is known. For example, blocks 422, 424, 426, 428, 432 shown in FIG. 16 may include the same processes described with respect to FIG. 15 above. In addition, method 420 includes creating a machine learning topology, as indicated in block 430, from the obtained network topology. The method 420 also includes training a hierarchical model, as indicated in block 434, which may include the machine learning input from block 432 and the machine learning topology from block 430. From the trained hierarchical model, the method 420 further includes the step of outputting the model for the user, as indicated in block 436.

Interpretability of Results with Machine Learning

FIG. 17 is a diagram of a chart 440 showing examples of meaningful or human-readable descriptions of patterns using a Conditional GAN algorithm trained using different hyper-parameters. By "meaningful," the descriptions convey a context and details. The chart 440 includes a column 442 for one or more images, a column 444 showing a "human" algorithm, a column 446 showing a "G-GAN, $z_1$" algorithm, a column 448 showing a "G-GAN, $z_2$" algorithm, and a column 450 showing a "G-MLE" algorithm. Most accurate machine learning techniques for object recognition rely on deep neural networks, which are inherently difficult to interpret, as they are trained to detect patterns using a large number of latent features in numerous hidden layers. Hence, while they can be effective and accurate to predict a root-cause, they may provide little insight to a human user regarding the rationale behind the predictions.

To address this and provide network operators an explanation of the detected pattern, the systems and methods of the present disclosure include embodiments that use adversarial machine learning techniques derived from caption generator techniques also used in computer vision. Using this technique, an explanation generator and a discriminator are training jointly in an adversarial manner, that is, the objective of the discriminator is to predict if a pattern corresponds to a description from a human or from the generator, whereas the generator (based on deep LSTMs neural nets) is trained to produce meaningful descriptions. Meaningful descriptions (labels) required for training both the discriminator and the generator may be obtained from various sources, including NOC ticketing systems (e.g. Netcool), user documentation and/or troubleshooting guides, or user feedback from within the UI.

Examples of Multi-Facility Patterns in Time-Series

From a software engineering viewpoint, the ability to analyze a multi-layer network all at once, with a single (object recognition) algorithm, may be very convenient and very generic. It may avoid the need to break down the network into many pieces, which typically requires domain-specific data preparation. However, an advantage of analyzing multi-layer facilities together is the benefit of providing richer insights and superior accuracy compared with conventional solutions. The following are a few specific examples.

Considering a "Loss of Signal" (LOS) parameter of an Ethernet service, which can be a critical service-affecting event that may have a serious business impact for network operators, the LOS parameter can have a variety of root-causes. For example, some root causes may be an optical fiber cut, dirty optical fibers, dirty connectors, excessive attenuation, among others.

Embodiments of various methods are provided. In step 1, it is possible to distinguish between the various root-causes to identify the specific location of the problem and even to predict these problems ahead of time. This can be done by combining data from various facilities. For example, the data of Physical Coding Sublayer Code Violations from Ethernet facilities (Layer 2) may be obtained. Data regarding pre-Forward Error Correction (FEC) Bit-Error Rate (BER), or pre-FEC BER, and High Correction Count Second (HCCS) from OTM facilities (Layer 1) may be obtained. Data regarding optical return loss, optical power received (total and per channel), etc., for AMP (Layer 0) may be obtained. Data regarding differential group delay, polarization dependent loss, etc., from PTP (Layer 0) may be obtained. Data regarding span loss from OSC (Layer 0) may also be obtained. This data can be then be combined. It may not be possible to obtain this data by looking at any of the facilities individually.

In step 2, instead of simply predicting that the root cause of an abnormal port as a "laser glitch" or "aging fiber," the adversarial explanator may be provide a description like: "The drop of optical power received at facility X combined with the increase physical coding sublayer unavailable seconds indicates a 95% chance of a laser glitch in the next 3 days." or "The increased span loss and bit error rate average combined with the lower optical power received at facility OTM-1-2-3 suggests fiber is aging." This demonstrates the potential power of analyzing patterns from multi-facility objects, instead of analyzing atomic facilities individually. According to some embodiments, the system of the present disclosure may use object recognition techniques to do so, combined with adversarial methods to facilitate interpretability by human experts and network operators.

Figure 18:
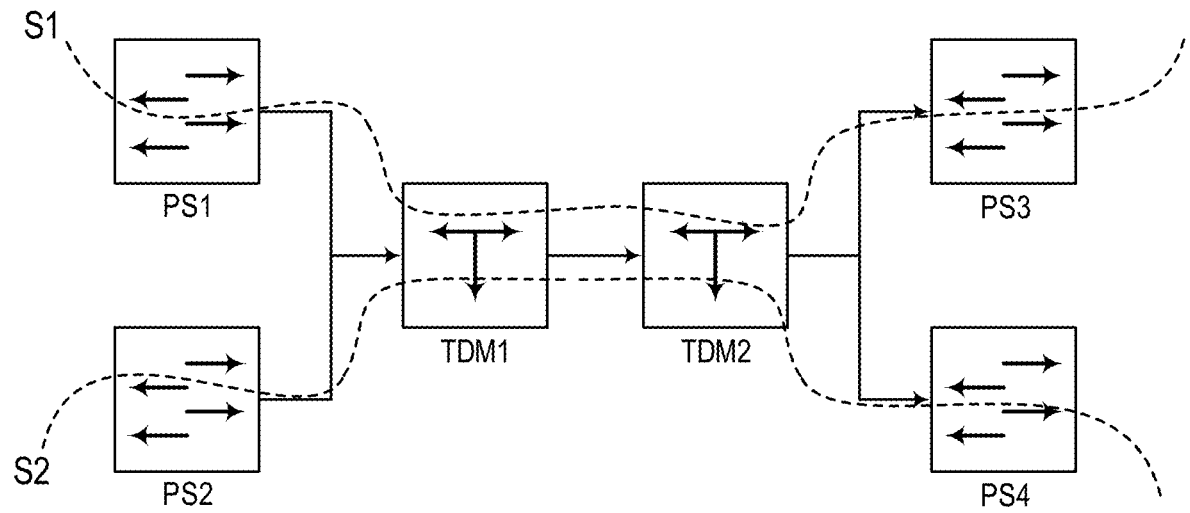
FIG. 18 is a block diagram showing an example of service dependency, according to some embodiments.

FIG. 18 is an example of a network 460 showing service dependency. In this example, the network 460 includes a first Packet Switching (PS) device (PS1), a second PS device (PS2), a first Time-Division Multiplexing (TDM) device (TDM1), a second TDM (TDM2), a third PS device (PS3), and a fourth PS device (PS4). A first service (S1) is configured along a path utilizing PS1, TDM1, TDM2, and PS3. A second service (S2) is configured along a path utilizing PS2, TDM1, TDM2, and PS4. As shown, the multiple services may share paths, links, and devices in the network. When considering network topology, machine learning should be aware of their correlations to speed up training and improve accuracy of predictions.

Figure 19:
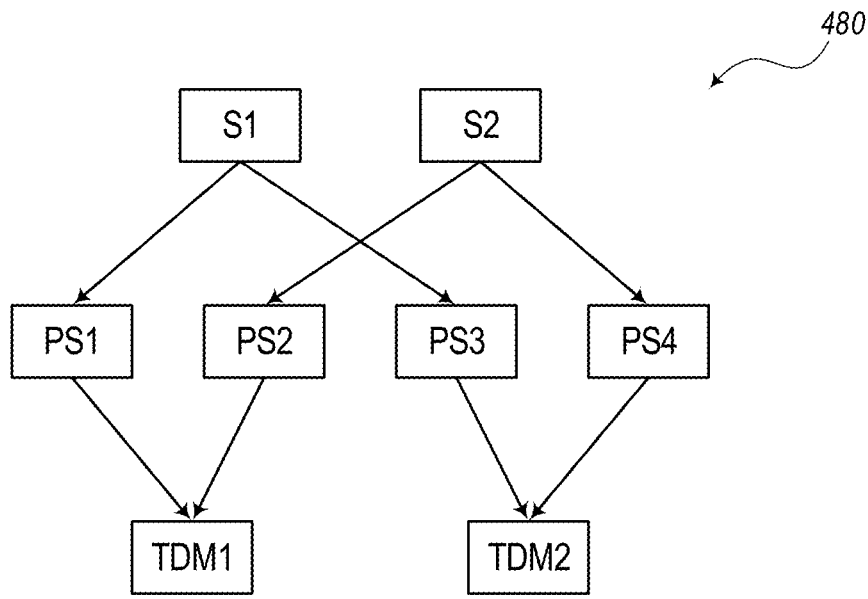
FIG. 19 is a block diagram showing a graph of service dependency, according to some embodiments.

FIG. 19 is a diagram showing a graph 480 of service dependency related to the arrangement or topology of elements in the network 460 of FIG. 18. Service S1 depends on PS1, PS3, TDM1 and TDM2. Service S2 depends on PS2, PS4, TDM1 and TDM2. Dependencies can be used to devise machine learning structures for improved processing.

Figure 20:
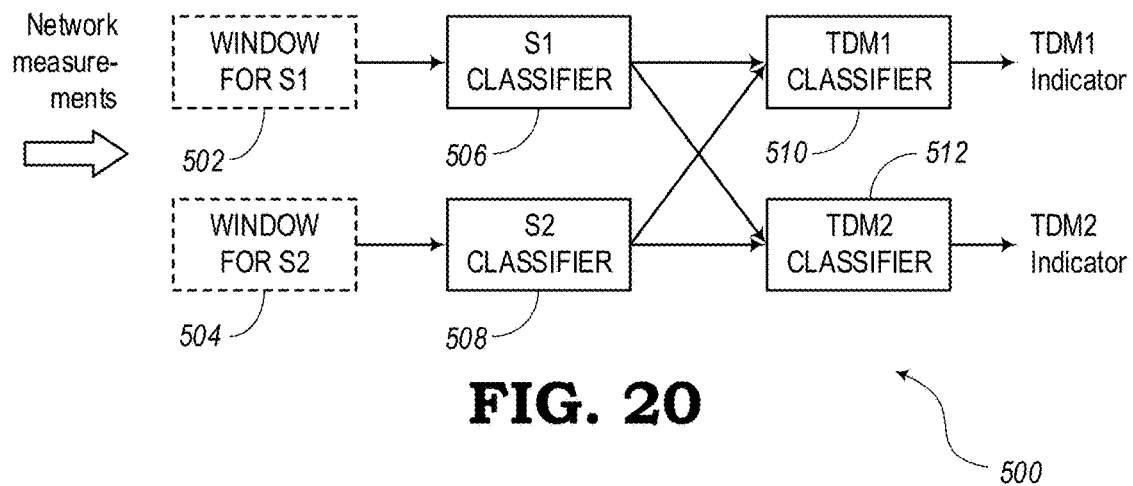
FIG. 20 is a block diagram showing hierarchical ML for root cause analysis using top down dependencies, according to some embodiments.

FIG. 20 is an embodiment of a functional layout 500 showing hierarchical machine learning for root cause analysis (top down dependencies). The functional layout 500 includes a first window 502 for S1, a second window 504 for S2, a first classifier 506 for S1, a second classifier 508 for S2, a first classifier 510 for TDM1, and a second classifier 512 for TDM2. Network measurements are obtained and provided to windows 502, 504. The S1 classifier 506 provides results to the TDM classifiers 510, 512 and the S2 classifier 508 also provides results to the TDM classifiers 510, 512. The TDM1 classifier 510 outputs a TDM1 indicator and the TDM2 classifier 512 outputs a TDM2 indicator.

The machine learning is trained to learn the root causes of service problems. The hierarchy of machine learning is built from the dependency graph 480 of FIG. 19. Each machine could be independent of other machines. A global neural network classifier could be created using a Graph Neural Network (GNN) as described in *Graph Neural Networks: A Review of Methods and Applications*, https://arxiv.org/pdf/1812.08434.pdf), the contents of which are incorporated by reference herein. Windows 502, 504 are obtained using any suitable methodology. For example, object recognition algorithms could be used in the S1 classifier 506 and S2 classifier 508 to detect patterns associated with bad service or other issue in the network. The TDM1 classifier 510 and TDM2 classifier 512 may be trained to correlate signals from the S1 and S2 classifiers 506, 508.

Figure 21:
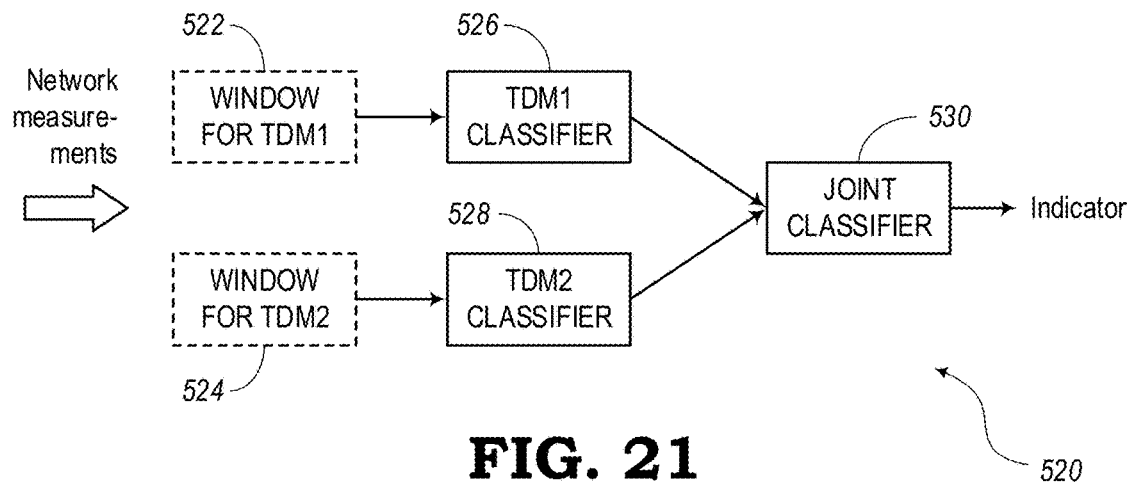
FIG. 21 is a block diagram showing enhanced detection of network anomalies by correlating multiple time-series using bottom-up dependencies, according to some embodiment.

FIG. 21 is an embodiment of a functional layout 520 showing enhanced detection of network anomalies by correlating multiple time-series (bottom-up dependencies) and has many similarities to the layout 500 of FIG. 20. Windows 522, 524 are obtained using any suitable methodology (e.g., the techniques and processes described above). TDM1 and TDM2 classifiers 526, 528 may be pattern detectors. Conceptually, there may be three classifiers, one for each network entity and one to decide if the entities together are detecting a problem. This can be implemented with ensemble learning by a joint classifier 530, which may be based on a voting technique. The joint classifier 530 may implement a classification process (e.g. using a Support Vector Machine (SVM)) that recognizes the joint pattern detected. Also, the layout 520 may be implemented with a structured neural network where TDM1 and TDM2 classifiers 526, 528 are configured as sub-networks.

Figure 22:
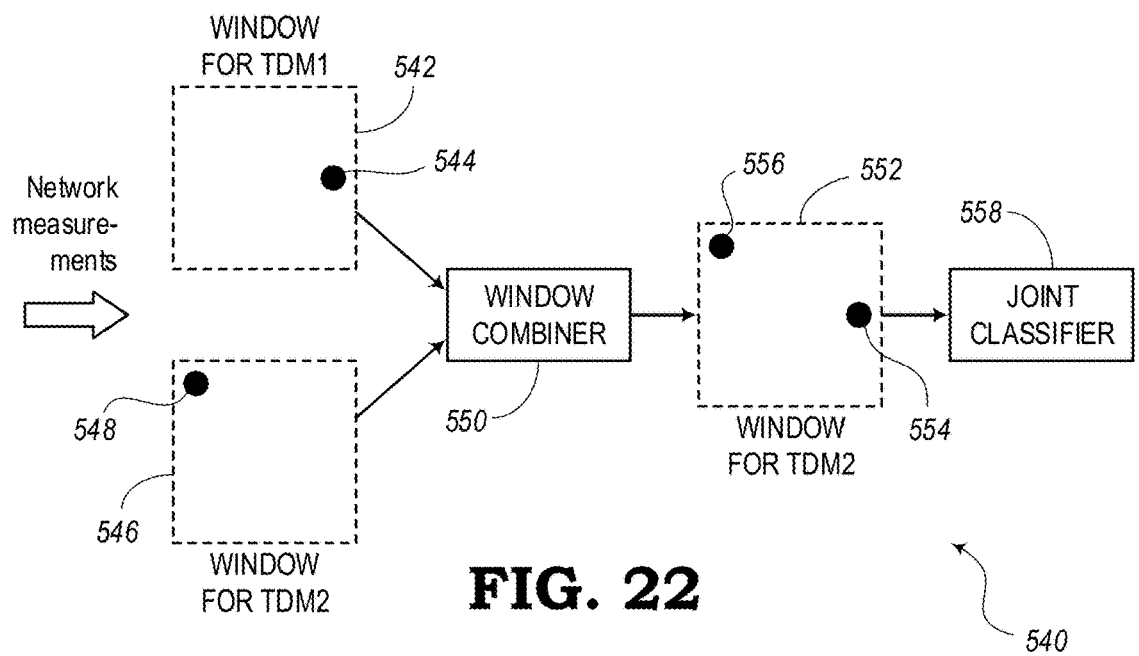
FIG. 22 is a block diagram showing enhanced detection with feature engineering using bottom-up dependencies, according to some embodiments.

FIG. 22 is an embodiment of a functional layout 540 showing enhanced detection with feature engineering (bottom-up dependencies) and may have many similarities with the layouts 500, 520 of FIGS. 20 and 21, respectively. A first window 542 having a first object 544 and a second window 546 having a second object 548 may be obtained using the methodologies described above. The windows 542, 546 may be obtained over overlapping time periods, but may not completely coincide (e.g., one can be bigger, one can be earlier, etc.). A window combiner 550 may be used to combine the windows 542, 546. A resulting window 552 includes the combination of windows 542, 546 where objects 554, 556 of the resulting window 552 correspond to objects 544, 548, respectively. A joint classifier 558 is used for detecting the two different objects 554, 556 coexisting in the same time frame. For example, the joint classifier 558 may be a Mask R-CNN. The layout 540 may be used by a system (e.g., control devices 26, 46, server 130, etc.) and can be used even without the topology information to find network entities that are correlated.

Figure 23:
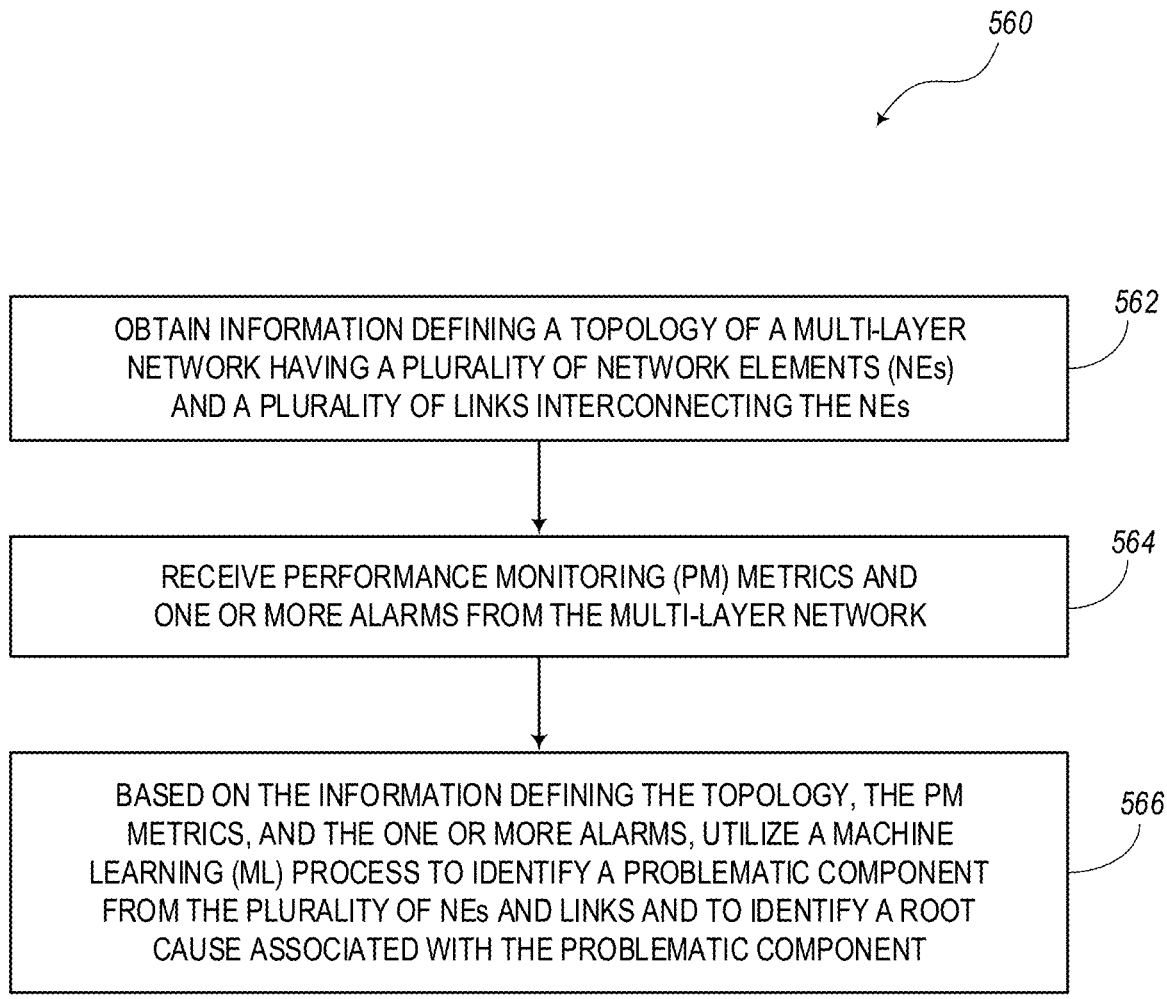
FIG. 23 is a flow diagram illustrating a process for identifying a root cause of one or more issues in a network, according to various embodiments.

FIG. 23 is a flow diagram illustrating an embodiment of a process 560 for identifying a root cause of one or more issues in a network. The process 560 includes a step of obtaining information defining a topology of a multi-layer network having a plurality of Network Elements (NEs) and a plurality of links interconnecting the NEs, as indicated in block 562. The process 560 also include a step of receiving Performance Monitoring (PM) metrics and one or more alarms from the multi-layer network, as indicated in block 564. Based on the information defining the topology, the PM metrics, and the one or more alarms, the method further comprises the step of utilizing a Machine Learning (ML) process to identify a problematic component from the plurality of NEs and links and to identify a root cause associated with the problematic component. As such, the problematic component may be identified as the root cause of one or more issues in the multi-layer network.

Furthermore, the process 560 may be further defined as follows. The ML process may be configured to utilize a single ML model for the entire multi-layer network. The single ML model may be configured to utilize a technique similar to an object recognition technique. For example, the single ML model may be configured to treat a condition of the multi-layer network as a two-dimensional snapshot and to utilize an object recognition technique on a plurality of two-dimensional snapshots obtained over time. The step of utilizing the ML process (block 566) may include the steps of: a) utilizing a plurality of ML models where each ML model corresponds to a respective NE, and b) hierarchically combining results from the plurality of ML models.

The ML process may include an explanation generator configured to generate human-readable text describing the problematic component, wherein the human-readable text includes an explanation that provides insight for remediating the root cause or problematic component. The ML process may further include a discriminator trained jointly with the explanation generator in an adversarial manner, the discriminator configured to predict if a pattern corresponds to a description from a human or the explanation from the explanation generator The ML process may utilize a ML model that is trained using a supervised classifying process for labelling data to teach a classifier to differentiate between problematic components and normal components and to identify different types of potential issues in the multi-layer network. The supervised classifying process may include cross-layer labelling. The cross-layer labelling may include at least one of labelling an amplifier according to a Signal-to-Noise Ratio (SNR) of an overlaid Optical-channel Transport Network (OTN) service, labelling an Optical-channel Data Unit (ODU) facility according to delay and jitter of an overlaid Internet Protocol (IP) or Multi-Protocol Label Switching (MPLS) tunnel, labelling traffic flow according to packet drops of underlaid switches, labelling overlay metrics according to a Loss of Signal (LoS) on a port of a packet-optical module when there is no error on a line-port, etc.

The process 560 may further be described whereby each of the plurality of NEs includes a single port, a single Optical-channel Transport Unit (OTU) on the port, or an amplifier connected to the port. The plurality of NEs may be arranged in an underlay layer of the multi-layer network, wherein the multi-layer network may include a composite structure arranged in an overlay layer. The PM metrics may include at least one of optical power, pre-Forward Error Correction Bit Error Rate (pre-FEC BER), received discarded frames, transmitted discarded frames, latency, and jitter. The one or more alarms may include at least one of Loss of Signal (LoS), channel degrade, high fiber loss, high received span loss, optical line failure, and shutoff threshold crossed.

To summarize, one aspect of the present embodiments may include a ML framework to solve the LRI problem by leveraging network topology information (i.e., to locate the root issue, such as a single problematic NE, in the context of a larger composite structure). Another aspect may include a topology that is used to build composite structures at an overlay layer from atomic objects of an underlay layer. Also, one aspect may include label underlay objects according to the state of an overlay structure.

The present disclosure also enables classification of objects according to their impact on the overlay layer. For example, this may include a) labelling an AMP according to the SNR of its overlaid ODU, b) labelling an ODU according to delay and jitter of its overlaid IP/MPLS tunnel, c) labelling overlay structures according to the state of their underlay objects. Also, this may include enabling classification of structures according to the state of their underlaid constituents, for example, by labelling IP traffic flows according to the state of underlaid OTN objects, labelling overlay higher-order composite structures according to the state of their underlaid constituents, such as by labelling a video QoE according to the state of underlaid AMP, where the video flows through an IP/MPLS tunnel composed of several Layer-3 hops, themselves composed of layer-1 (ODU/OTU) hops, themselves composed of many layer-0 spans (AMP).

Using labeled datasets above, the systems and methods of the present disclosure may be configured to train supervised ML models to locate the root-cause issue within a problematic composite structure. For example, this may include locating faulty AMP causing ODU loss of signal, locating faulty OTU hop causing IP/MPLS latency, locating problematic periods within a long multi-variate time-series, and using labeled datasets above, train supervised ML models to classify atomic NE according to their impact on overlay layer, by, for example, differentiating between problematic span loss (layer-0) causing excessive bit-error rate at overlay layer-1 (OTN) vs tolerable span loss causing no degradation of OTN signal, implementation of supervised ML above with a single model for the entire composite structure, using object recognition methods to classify atomic NE underlaid, using deep learning algorithms (e.g., RCNN, OverFeat, SPPNets, YOLO, MultiBox, SSD, Mask R-CNN, GANs, LSTMs, etc.), implementation of supervised ML above with multiple models (one for each atomic NE) combined hierarchically, generation of human friendly interpretation of the patterns detected with supervised ML (above) for improved user-experience, etc.

In operation, the systems and method for object recognition, as described with respect to the various embodiments of the present disclosure, may include solutions to the shortcomings of the conventional systems, such as NHP. The present embodiments may consider a fully stitched network instead of looking at atomic facilities independently. Also, the embodiments may perform multiple pattern-recognitions with a machine learning algorithm, whose architecture matches the physical network. The embodiments can also generate qualitative meaningful descriptions of the detected pattern.

Also, an API of the present embodiments may be provided, allowing a user to access the system programmatically, which would indicate how the system may be built. Also, a GUI may be used to show how the topology relates to the machine learning results, as explained in more detail below.

Network time-series could be reported on a topology where all elements are independent and a network topology where the elements are dependent (as in the actual network). The results of object detection would be different if the topology is used during machine learning stages.

The features of the present object recognition techniques can be detectable to users in many ways. For example, some aspects of detection of the present embodiments may include:

1) evidence that object recognition methods are used to identify components of a stitched network;

2) evidence that object recognition methods are used to classify state of components of a stitched network; and 3) evidence that object recognition methods are used to identify and classify changing states of a network component over time.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system comprising:
a processing device, and
a memory device configured to store a computer program having instructions that, when executed, enable the processing device to
obtain information defining a topology of a multi-layer network having a plurality of Network Elements (NEs) and a plurality of links interconnecting the NEs,
receive Performance Monitoring (PM) metrics and one or more alarms from the multi-layer network, and
based on the information defining the topology, the PM metrics, and the one or more alarms, utilize a Machine Learning (ML) process to identify a problematic component from the plurality of NEs and links and to identify a root cause associated with the problematic component.

2. The system of claim 1, wherein the ML process is configured to utilize a single ML model for all of the multi-layer network.

3. The system of claim 2, wherein the single ML model is configured to treat a condition of the multi-layer network as a two-dimensional snapshot and to utilize an object recognition technique on a plurality of two-dimensional snapshots obtained over time.

4. The system of claim 1, wherein the instructions enable the processing device to utilize the ML process by
utilizing a plurality of ML models, each ML model corresponding to a respective NE, and
hierarchically combining results from the plurality of ML models.

5. The system of claim 1, wherein the ML process includes an explanation generator configured to generate human-readable text describing the problematic component, wherein the human-readable text includes an explanation that provides insight for remediating the root cause or problematic component.

6. The system of claim 5, wherein the ML process further includes a discriminator trained jointly with the explanation generator in an adversarial manner, the discriminator configured to predict if a pattern corresponds to a description from a human or the explanation from the explanation generator.

7. The system of claim 1, wherein
the ML process utilizes a ML model that is trained using a supervised classifying process for labelling data to teach a classifier to differentiate between problematic components and normal components and to identify different types of potential issues in the multi-layer network.

8. The system of claim 7, wherein the supervised classifying process includes a cross-layer labelling strategy that includes at least one of labelling an amplifier according to a Signal-to-Noise Ratio (SNR) of an overlaid Optical-channel Transport Network (OTN) service, labelling an Optical-channel Data Unit (ODU) facility according to delay and jitter of an overlaid Internet Protocol (IP) or Multi-Protocol Label Switching (MPLS) tunnel, labelling traffic flow according to packet drops of underlaid switches, and labelling overlay metrics according to a Loss of Signal (LoS) on a port of a packet-optical module when there is no error on a line-port.

9. The system of claim 1, wherein each of the plurality of NEs includes any of a single port, a single Optical-channel Transport Unit (OTU) on the port, and an amplifier connected to the port, wherein the plurality of NEs are arranged in an underlay layer of the multi-layer network, and wherein the multi-layer network includes a composite structure arranged in an overlay layer.

10. The system of claim 1, wherein the PM metrics include at least one of optical power, pre-Forward Error Correction Bit Error Rate (pre-FEC BER), received discarded frames, transmitted discarded frames, latency, and jitter, and wherein the one or more alarms include at least one of Loss of Signal (LoS), channel degrade, high fiber loss, high received span loss, optical line failure, and shutoff threshold crossed.

11. A method comprising the steps of
obtaining information defining a topology of a multi-layer network having a plurality of Network Elements (NEs) and a plurality of links interconnecting the NEs,
receiving Performance Monitoring (PM) metrics and one or more alarms from the multi-layer network, and
based on the information defining the topology, the PM metrics, and the one or more alarms, utilizing a Machine Learning (ML) process to identify a problematic component from the plurality of NEs and links and to identify a root cause associated with the problematic component.

12. The method of claim 11, wherein the ML process is configured to utilize a single ML model for all of the multi-layer network, and wherein the single ML model is configured to treat a condition of the multi-layer network as a two-dimensional snapshot and to utilize an object recognition technique on a plurality of two-dimensional snapshots obtained over time.

13. The method of claim 11, wherein the step of utilizing the ML process includes the steps of:
utilizing a plurality of ML models, each ML model corresponding to a respective NE, and
hierarchically combining results from the plurality of ML models.

14. The method of claim 11, wherein the ML process includes an explanation generator configured to generate human-readable text describing the problematic component, wherein the human-readable text includes an explanation that provides insight for remediating the root cause or problematic component.

15. The method of claim 14, wherein the ML process further includes a discriminator trained jointly with the explanation generator in an adversarial manner, the discriminator configured to predict if a pattern corresponds to a description from a human or the explanation from the explanation generator.

16. A non-transitory computer-readable medium that stores computer logic having instruction that, when executed, cause a processing device to:
obtain information defining a topology of a multi-layer network having a plurality of Network Elements (NEs) and a plurality of links interconnecting the NEs,
receive Performance Monitoring (PM) metrics and one or more alarms from the multi-layer network, and
based on the information defining the topology, the PM metrics, and the one or more alarms, utilize a Machine Learning (ML) process to identify a problematic component from the plurality of NEs and links and to identify a root cause associated with the problematic component.

17. The non-transitory computer-readable medium of claim 16, wherein
the ML process utilizes a ML model that is trained using a supervised classifying process for labelling data to teach a classifier to differentiate between problematic components and normal components and to identify different types of potential issues in the multi-layer network.

18. The non-transitory computer-readable medium of claim 17, wherein the supervised classifying process includes a cross-layer labelling strategy that includes at least one of labelling an amplifier according to a Signal-to-Noise Ratio (SNR) of an overlaid Optical-channel Transport Network (OTN) service, labelling an Optical-channel Data Unit (ODU) facility according to delay and jitter of an overlaid Internet Protocol (IP) or Multi-Protocol Label Switching (MPLS) tunnel, labelling traffic flow according to packet drops of underlaid switches, and labelling overlay metrics according to a Loss of Signal (LoS) on a port of a packet-optical module when there is no error on a line-port.

19. The non-transitory computer-readable medium of claim 16, wherein each of the plurality of NEs includes any of a single port, a single Optical-channel Transport Unit (OTU) on the port, and an amplifier connected to the port, wherein the plurality of NEs are arranged in an underlay layer of the multi-layer network, and wherein the multi-layer network includes a composite structure arranged in an overlay layer.

20. The non-transitory computer-readable medium of claim 16, wherein the PM metrics include at least one of optical power, pre-Forward Error Correction Bit Error Rate (pre-FEC BER), received discarded frames, transmitted discarded frames, latency, and jitter, and wherein the one or more alarms include at least one of Loss of Signal (LoS), channel degrade, high fiber loss, high received span loss, optical line failure, and shutoff threshold crossed.

* * * * *